United States Patent
Watanabe et al.

(10) Patent No.: US 10,899,079 B2
(45) Date of Patent: Jan. 26, 2021

(54) OPTICAL SHAPING APPARATUS AND METHOD OF PRODUCING SHAPED ARTICLE

(71) Applicant: SONY CORPORATION, Tokyo (JP)

(72) Inventors: Tomomasa Watanabe, Kanagawa (JP); Yoshiyuki Ishii, Kanagawa (JP); Yoshiaki Tashiro, Tokyo (JP); Fumiko Shiga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 291 days.

(21) Appl. No.: 15/756,124

(22) PCT Filed: Jul. 20, 2016

(86) PCT No.: PCT/JP2016/071220
§ 371 (c)(1),
(2) Date: Feb. 28, 2018

(87) PCT Pub. No.: WO2017/047222
PCT Pub. Date: Mar. 23, 2017

(65) Prior Publication Data
US 2018/0243994 A1    Aug. 30, 2018

(30) Foreign Application Priority Data
Sep. 17, 2015    (JP) .................... 2015-183547

(51) Int. Cl.
*B29C 64/393*    (2017.01)
*B29C 64/264*    (2017.01)
(Continued)

(52) U.S. Cl.
CPC .......... *B29C 64/393* (2017.08); *B29C 64/264* (2017.08); *B33Y 10/00* (2014.12); *B33Y 30/00* (2014.12); *B33Y 50/02* (2014.12)

(58) Field of Classification Search
CPC ........................... B29C 64/264; B29C 64/393
See application file for complete search history.

(56) References Cited

U.S. PATENT DOCUMENTS

| | | | |
|---|---|---|---|
| 5,497,254 A | 3/1996 | Amako et al. | |
| 5,682,214 A | 10/1997 | Amako et al. | |
| | (Continued) | | |

FOREIGN PATENT DOCUMENTS

| | | |
|---|---|---|
| EP | 0451681 A2 | 10/1991 |
| JP | 56-144478 A | 11/1981 |
| | (Continued) | |

OTHER PUBLICATIONS

International Search Report and Written Opinion of PCT Application No. PCT/JP2016/071220, dated Aug. 30, 2016, 10 pages.

*Primary Examiner* — Jacob T Minskey
*Assistant Examiner* — Virak Nguon
(74) *Attorney, Agent, or Firm* — Chip Law Group

(57) ABSTRACT

Provided is an optical shaping apparatus that includes a light source that outputs diffusion light or converging light as outgoing light, an optical function section that is disposed in an optical path of the outgoing light and modulates the optical path or a phase of the outgoing light, and a sensor that acquires positional data of an object surface. The optical shaping apparatus further includes a controller that controls operation of the optical function section on the basis of the positional data and coordinate data of a shaped article, to apply modulated light generated by the optical function section to the object surface.

16 Claims, 20 Drawing Sheets

(51) Int. Cl.
 *B33Y 10/00* (2015.01)
 *B33Y 30/00* (2015.01)
 *B33Y 50/02* (2015.01)

(56) References Cited

U.S. PATENT DOCUMENTS

| | | | | |
|---|---|---|---|---|
| 2003/0214571 | A1* | 11/2003 | Ishikawa | B23K 26/0604 |
| | | | | 347/255 |
| 2009/0142436 | A1* | 6/2009 | Kuzusako | B33Y 30/00 |
| | | | | 425/174.4 |
| 2009/0175977 | A1 | 7/2009 | Kuzusako et al. | |
| 2017/0304947 | A1* | 10/2017 | Shibazaki | B33Y 30/00 |

FOREIGN PATENT DOCUMENTS

| | | | | |
|---|---|---|---|---|
| JP | 02-307730 | A | | 12/1990 |
| JP | 03-039234 | A | | 2/1991 |
| JP | 04-267132 | A | | 9/1992 |
| JP | 2000-167938 | A | | 6/2000 |
| JP | 2000167938 | A | * | 6/2000 |
| JP | 2003-305778 | A | | 10/2003 |
| JP | 2003-340923 | A | | 12/2003 |
| JP | 2009113294 | A | * | 5/2009 |
| JP | 2009-160860 | A | | 7/2009 |
| JP | 2012-232041 | A | | 11/2012 |
| WO | 2016/063665 | A1 | | 4/2016 |

* cited by examiner

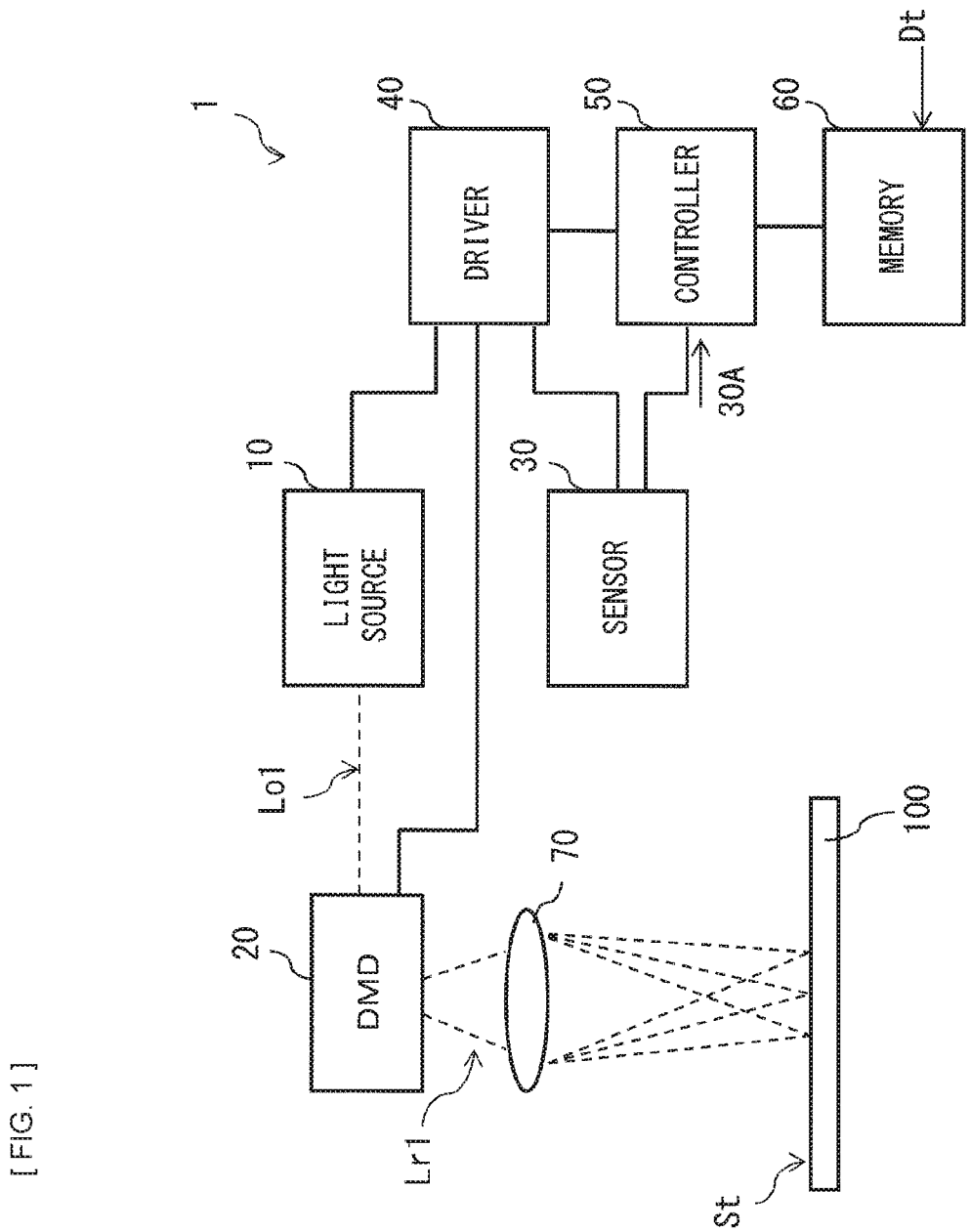
[FIG. 1]

[ FIG. 2A ]
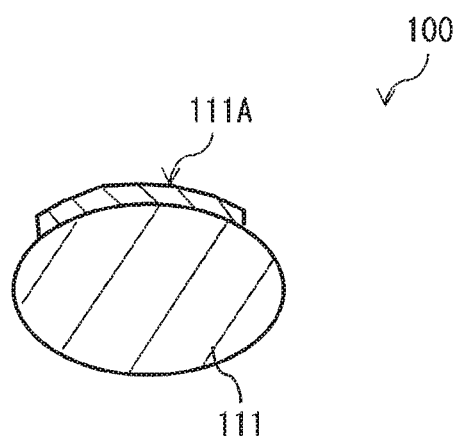
[ FIG. 2B ]
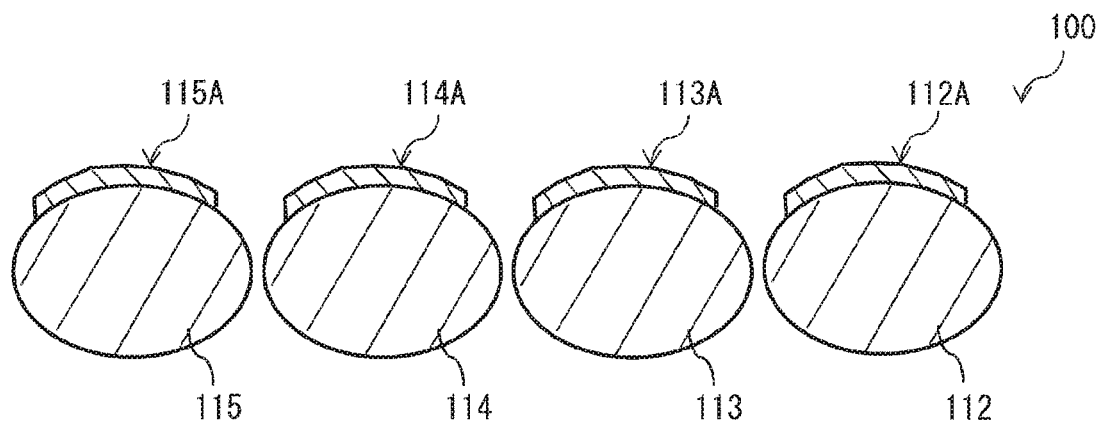

[ FIG. 3A ]
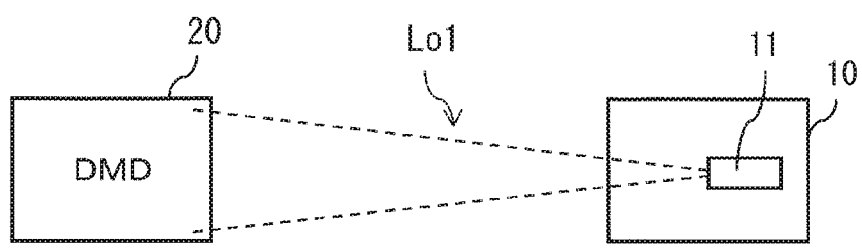
[ FIG. 3B ]
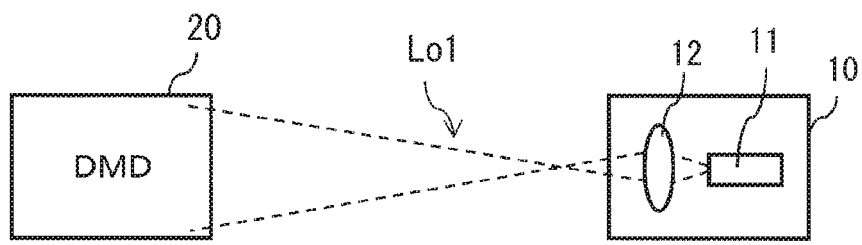

[ FIG. 4 ]
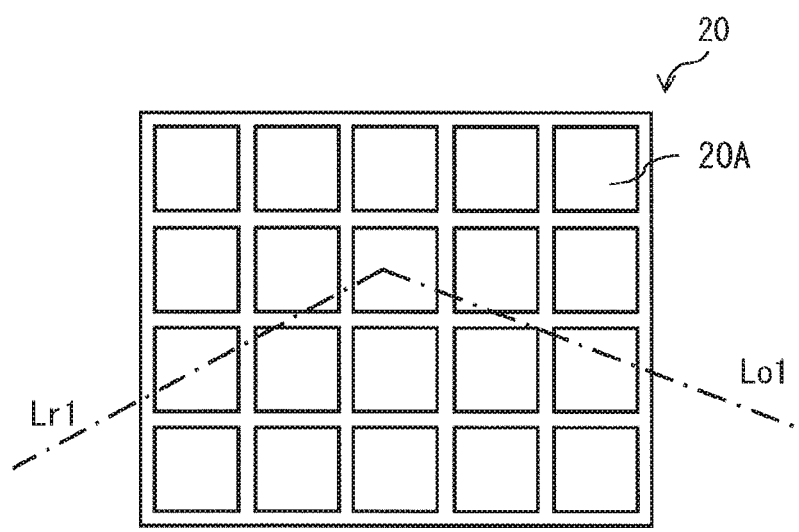

[ FIG. 5A ]
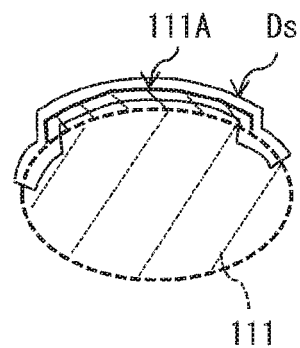
[ FIG. 5B ]
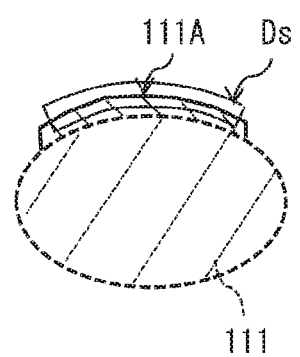

[ FIG. 6A ]
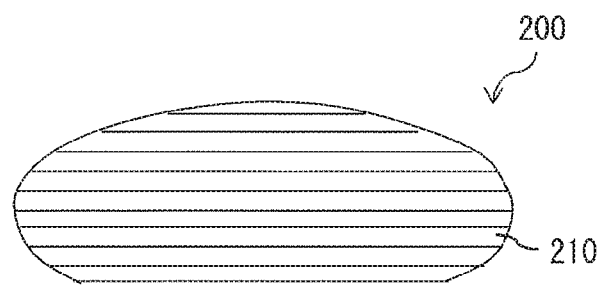
[ FIG. 6B ]
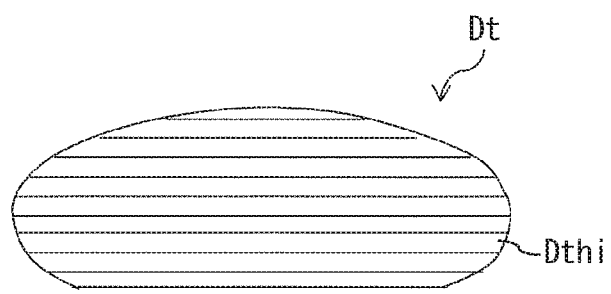

[ FIG. 7A ]
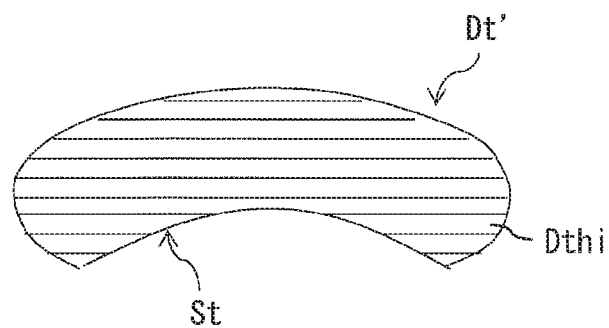
[ FIG. 7B ]
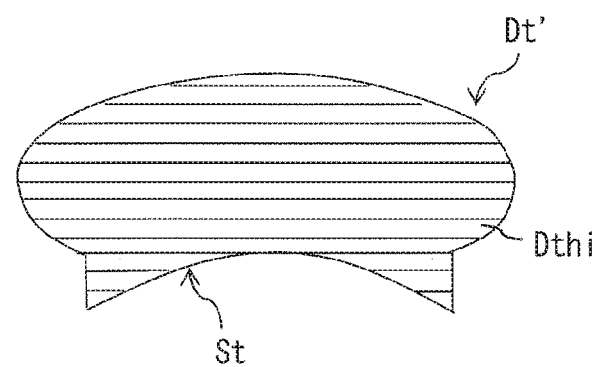
[ FIG. 7C ]
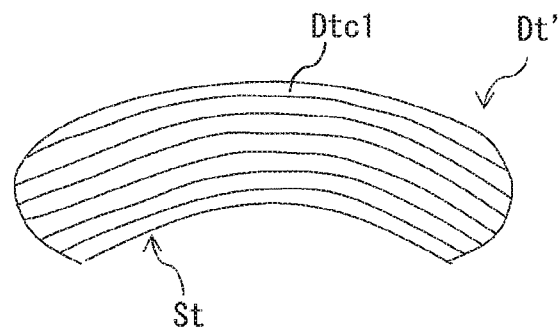

[ FIG. 8 ]
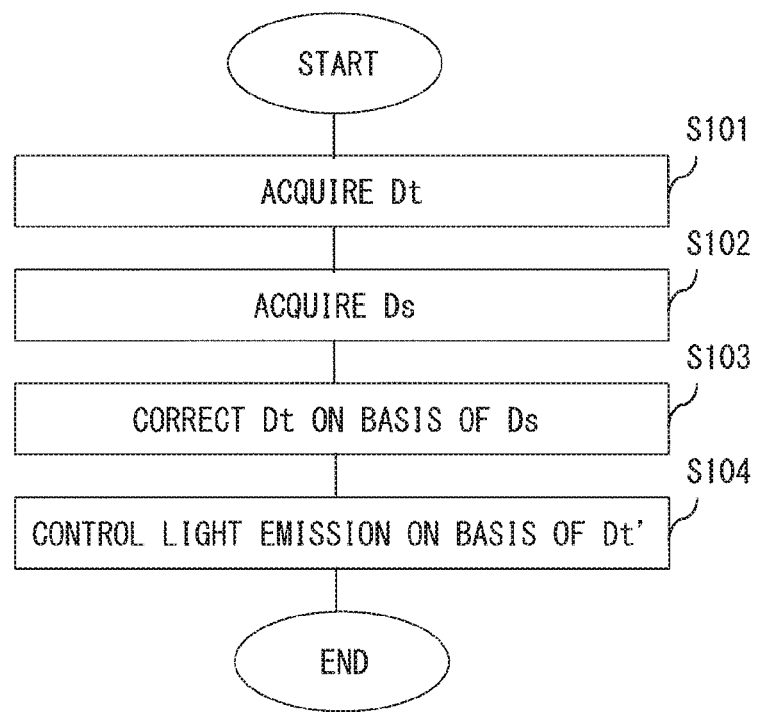

[ FIG. 9A ]
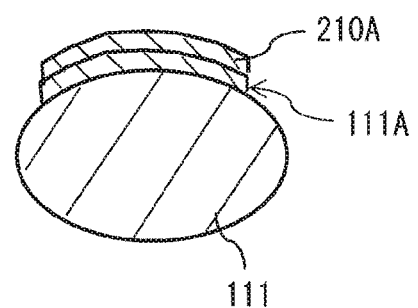
[ FIG. 9B ]
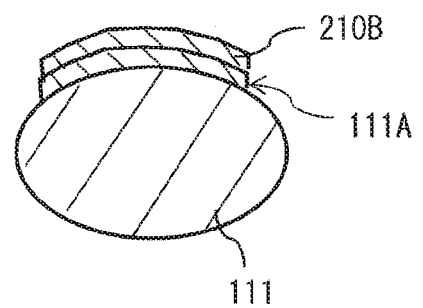

[ FIG. 9C ]
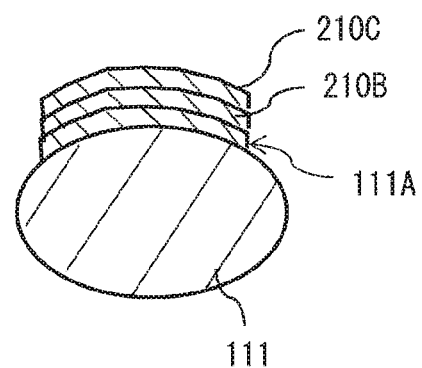
[ FIG. 9D ]
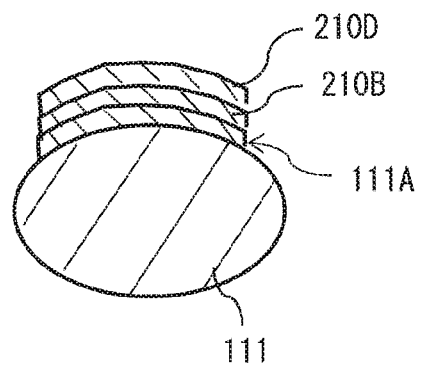

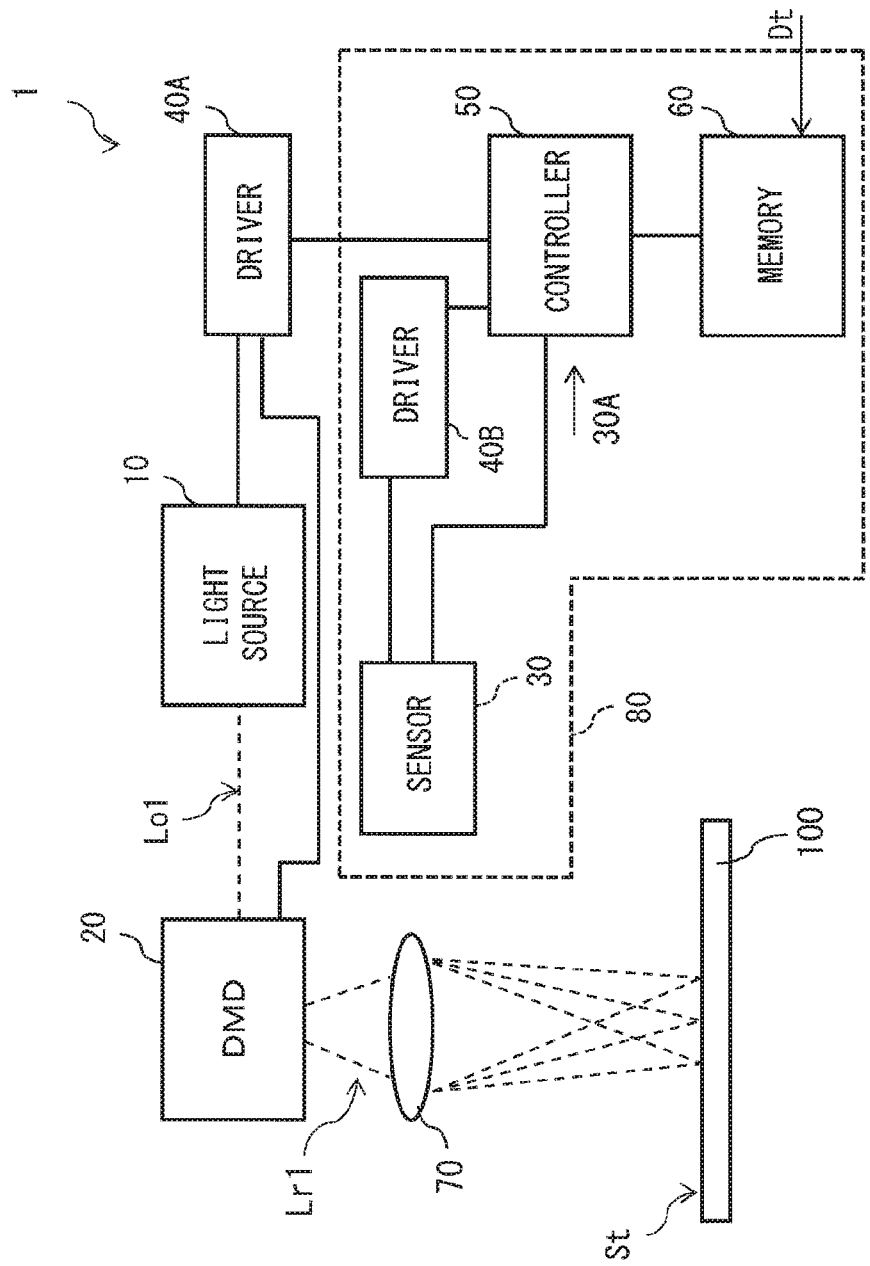
[FIG. 10A]

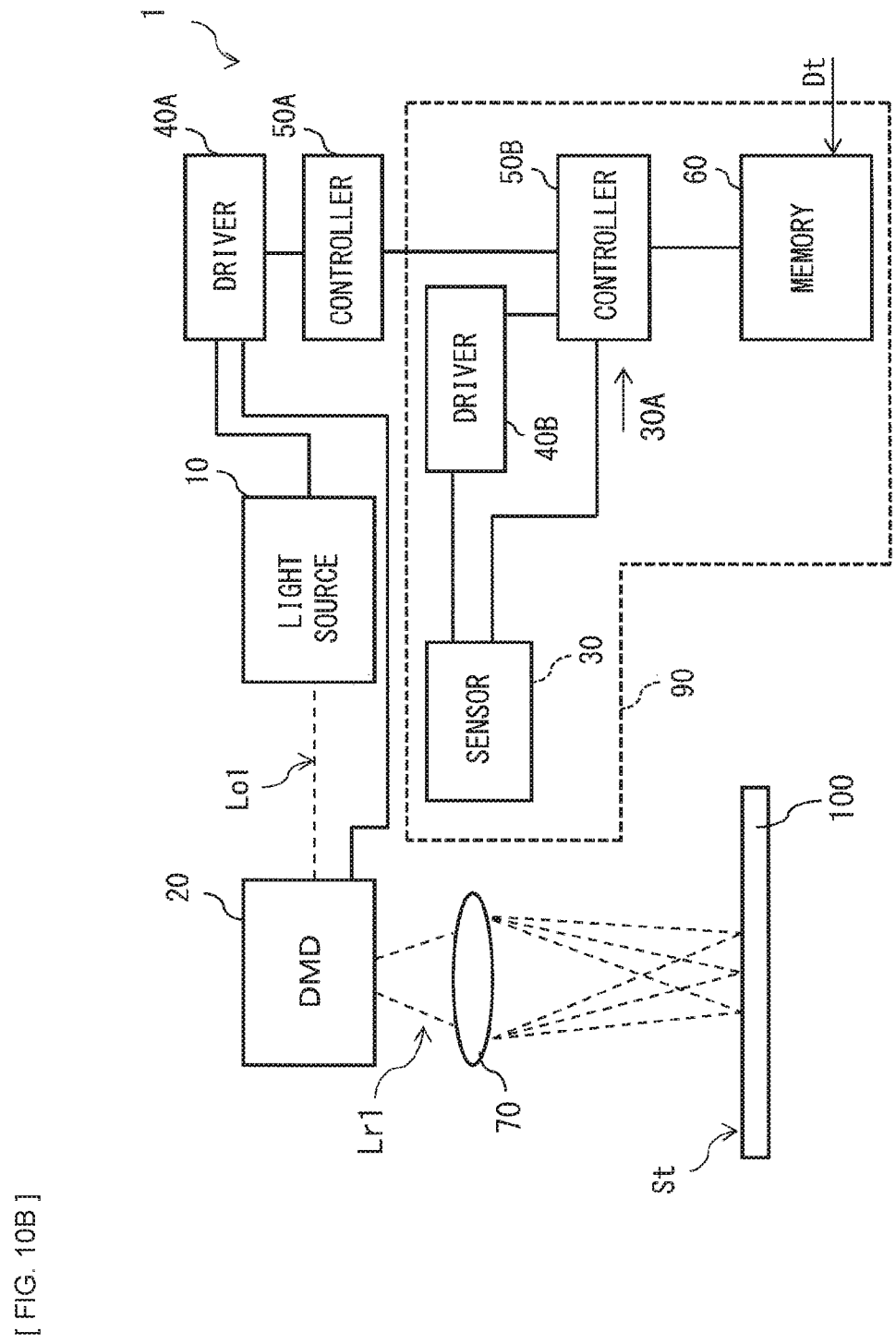
[FIG. 10B]

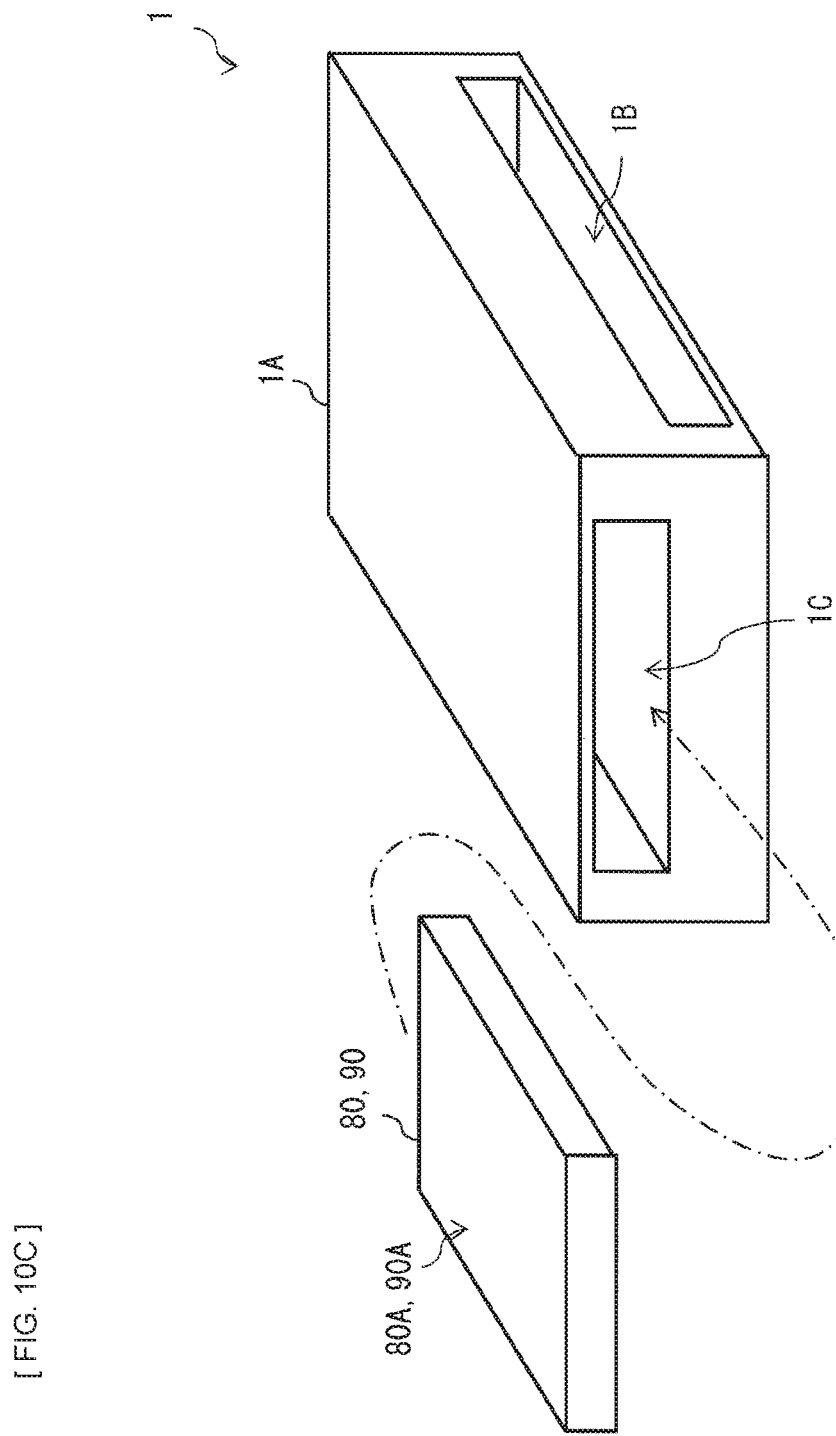

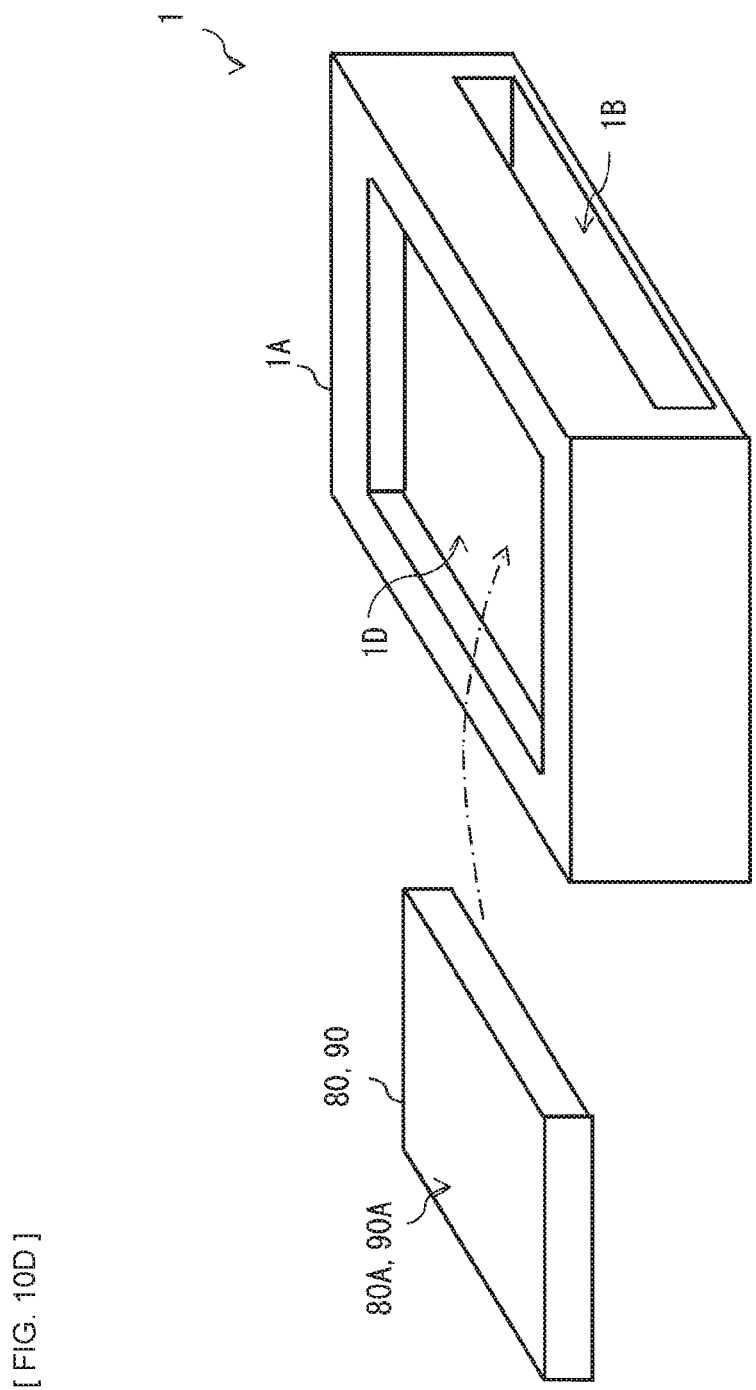
[ FIG. 10D ]

[ FIG. 11 ]
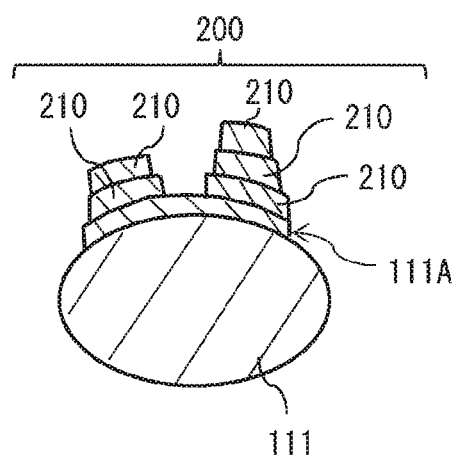

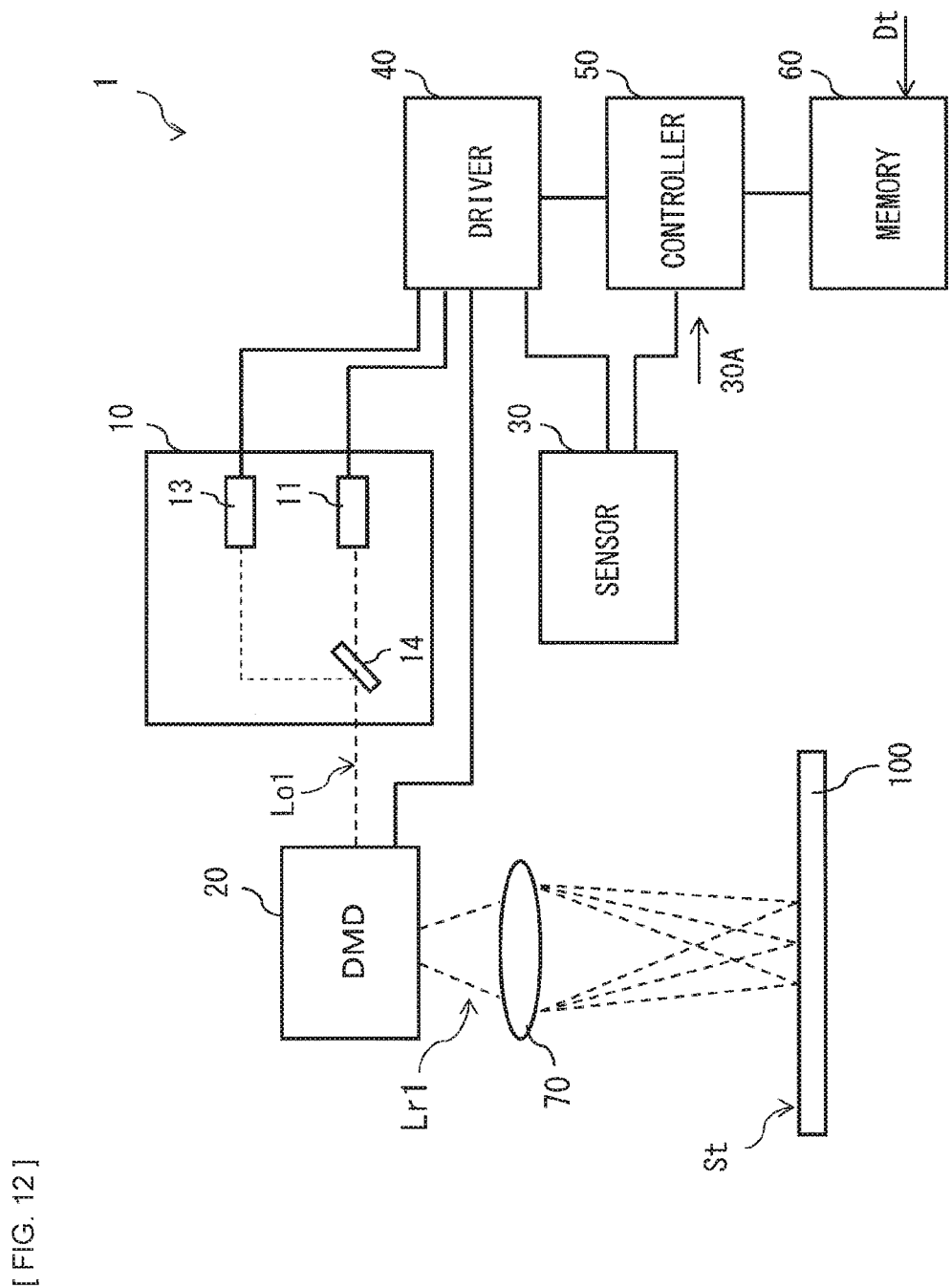
[FIG. 12]

[ FIG. 13 ]
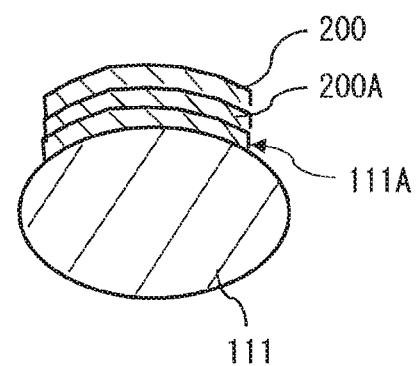

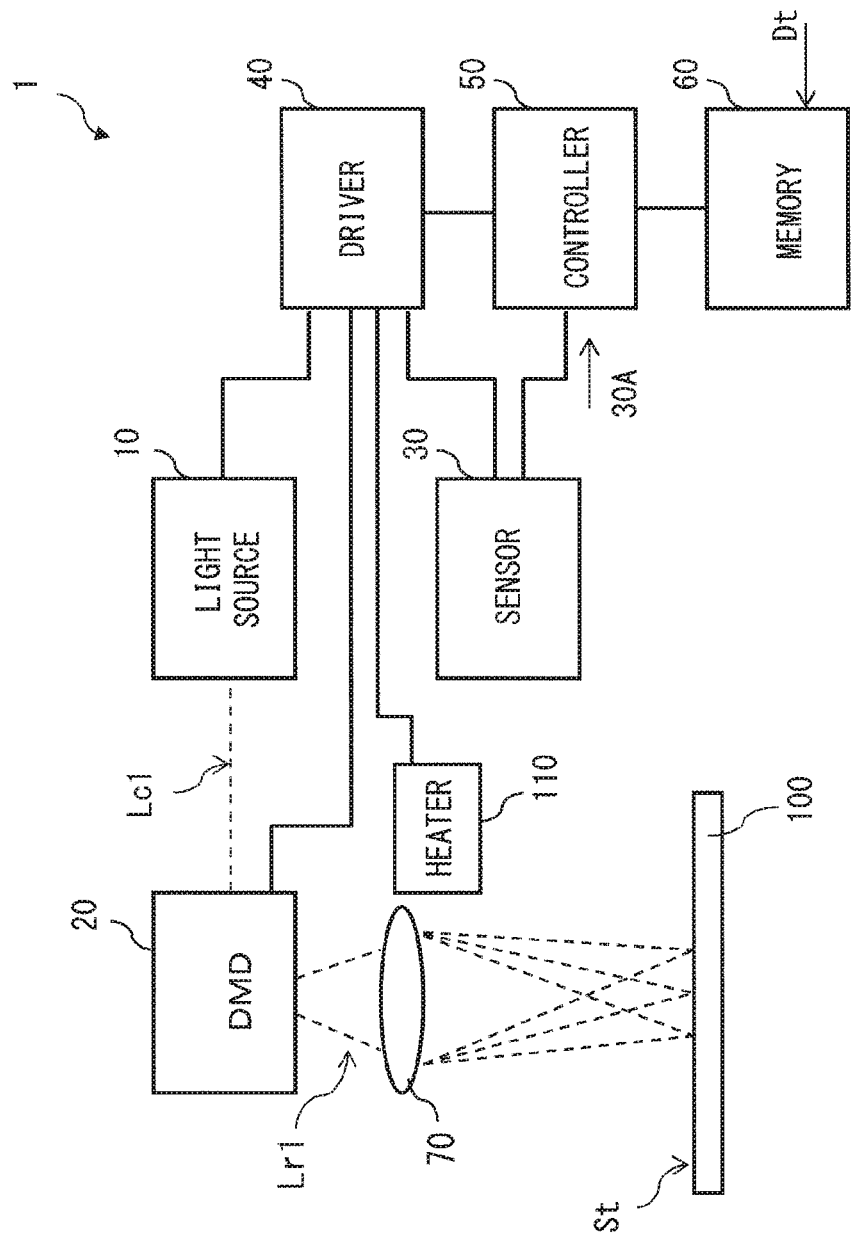
[FIG. 14]

[ FIG. 15 ]
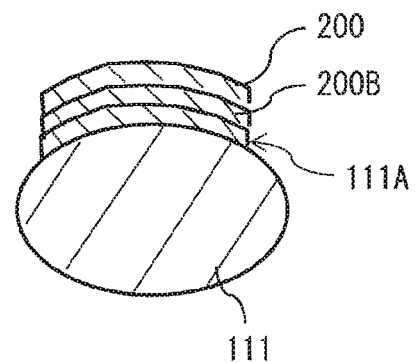
[ FIG. 16 ]
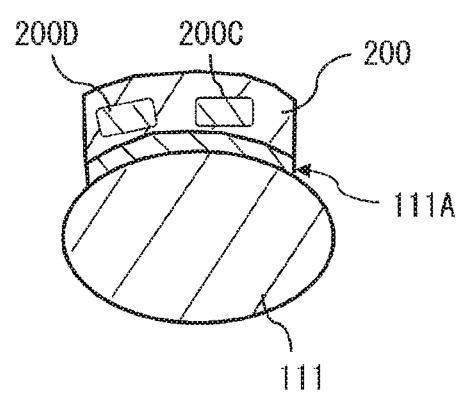

[ FIG. 17 ]
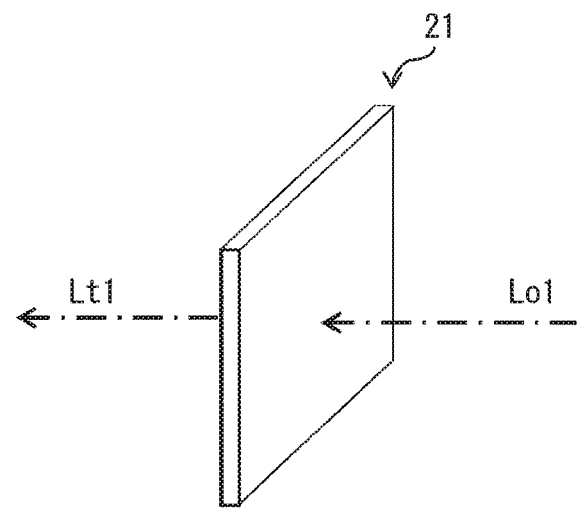
[ FIG. 18 ]
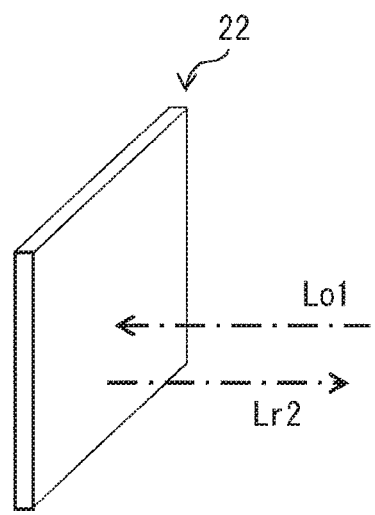

OPTICAL SHAPING APPARATUS AND METHOD OF PRODUCING SHAPED ARTICLE

CROSS REFERENCE TO RELATED APPLICATIONS

This application is a U.S. National Phase of International Patent Application No. PCT/JP2016/071220 filed on Jul. 20, 2016, which claims priority benefit of Japanese Patent Application No. JP 2015-183547 filed in the Japan Patent Office on Sep. 17, 2015. Each of the above-referenced applications is hereby incorporated herein by reference in its entirety.

TECHNICAL FIELD

The present technology relates to an optical shaping apparatus that forms a shaped article with use of transformation of a resin caused by light irradiation. In addition, the present technology relates to a method of producing a shaped article with use of transformation of a resin caused by light irradiation.

BACKGROUND ART

Various methods of producing a solid object on the basis of a three-dimensional model formed by a CAD (computer aided design) have been disclosed. For example, it is disclosed that the three-dimensional model is sliced into a plurality of thin cross-sectional pieces, and light emission control and beam scanning of a laser that focuses on a surface of a photosensitive resin are performed according to coordinate data of each of the cross-sectional pieces (e.g., see PTLs 1 and 2). In addition, for example, it is disclosed that ink ejection control and head scanning are performed according to the coordinate data of each of the cross-sectional pieces and the ink is cured through light irradiation (e.g., see PTLs 3 and 4).

In addition, various methods of curing a photocurable resin applied on a nail or a nail tip through light irradiation have been disclosed. For example, it is disclosed that color ink is printed on the nail or the nail tip according to image data and a surface coating is then printed, and curing is performed through light irradiation (e.g., see PTL 5).

CITATION LIST

Patent Literature

PTL 1: Japanese Unexamined Patent Application Publication No. S56-144478
PTL 2: Japanese Unexamined Patent Application Publication No. 2003-340923
PTL 3: Japanese Unexamined Patent Application Publication No. H2-307730
PTL 4: Japanese Unexamined Patent Application Publication No. H3-39234
PTL 5: Japanese Unexamined Patent Application Publication No. 2012-232041

SUMMARY OF INVENTION

In the methods disclosed in PTLs 1 to 4, however, in a case where the optical shaped article is produced in several stages, if a printing surface is moved (shifted) during the production, there is an issue that it is difficult to produce the optical shaped article in a desired shape. In the method disclosed in PTL 5, ultraviolet rays are widely applied inside a housing, which allows for production of the optical shaped article in the desired shape even if the printing surface is moved (shifted) during the production. In a case where the optical shaped article is produced on the nail, however, the ultraviolet rays are applied to a portion other than the nail by the method disclosed in PTL 5, which is large in burden on a human body. Further, even in a case where the optical shaped article is produced on goods, quality of the goods may be deteriorated if the ultraviolet rays are applied to a portion not needing light irradiation.

Accordingly, it is desirable to provide an optical shaping apparatus that makes it possible to produce an optical shaped article in several stages while suppressing adverse effects to a person and goods, and a method of producing a shaped article.

An optical shaping apparatus according to an embodiment of the technology includes: a light source that outputs diffusion light or converging light as outgoing light; an optical function section that is disposed in an optical path of the outgoing light and modulates the optical path or a phase of the outgoing light; and a sensor that acquires positional data of an object surface. The optical shaping apparatus further includes a controller that controls operation of the optical function section on the basis of the positional data and coordinate data of a shaped article, to apply modulated light generated by the optical function section to the object surface.

A method of producing a shaped article according to an embodiment of the technology includes the following two steps: (A) a first step of forming a first cured resin layer by modulating an optical path or a phase of diffusion light or converging light outputted as outgoing light from a light source, on the basis of positional data of an object surface and one of a plurality of pieces of horizontal cross-sectional data included in coordinate data of a shaped article, and applying modulated light obtained through the modulation, to a surface of a photosensitive resin applied on an object-to-be-stacked; and (B) a second step of forming a second cured resin layer by modulating the optical path or the phase of the diffusion light or the converging light outputted as the outgoing light from the light source, on the basis of the positional data and different one of the pieces of horizontal cross-sectional data in the coordinate data, and applying modulated light obtained through the modulation, to a surface of a photosensitive resin that is newly applied on the first cured resin layer formed by the first step.

In the optical shaping apparatus and the method of producing the shaped article according to the respective embodiments of the technology, the operation of the optical function section is controlled on the basis of the positional data of the object surface and the coordinate data of the shaped article, which causes the modulated light generated by the optical function section to be applied to the object surface. This makes it possible to prevent the light from being applied to a portion not needing light irradiation. In addition, in the technology, the position of the object surface is measured by the sensor. Therefore, even in the case where the object surface is moved (shifted) in the middle of the production of the optical shaped article, the position of the object surface is measured by the sensor again at that time. This allows for light irradiation in consideration of the shifting.

According to the optical shaping apparatus and the method of producing the shaped article of the respective embodiments of the technology, it is possible to prevent the light from being applied to a portion not needing light irradiation and to perform the light irradiation in consideration of the shifting. This makes it possible to produce the optical shaped article in several stages while suppressing adverse effects to a person and goods. Note that effects of the technology are not necessarily limited to the effects described here, and may be any of effects described in the present specification.

BRIEF DESCRIPTION OF DRAWINGS

FIG. 1 is a diagram illustrating an example of a schematic configuration of an optical shaping apparatus according to an embodiment of the technology.

FIG. 2A is a diagram illustrating an example of a cross-sectional configuration of an object-to-be-stacked in FIG. 1.

FIG. 2B is a diagram illustrating an example of the cross-sectional configuration of the object-to-be-stacked in FIG. 1.

FIG. 3A is a diagram illustrating an example of a schematic configuration of a light source in FIG. 1.

FIG. 3B is a diagram illustrating an example of a schematic configuration of the light source in FIG. 1.

FIG. 4 is a diagram illustrating an example of a schematic configuration of a DMD in FIG. 1.

FIG. 5A is a diagram conceptually illustrating an example of positional data.

FIG. 5B is a diagram conceptually illustrating an example of the positional data.

FIG. 6A is a diagram illustrating an example of a cross-sectional configuration of a shaped article.

FIG. 6B is a diagram conceptually illustrating an example of coordinate data.

FIG. 7A is a diagram conceptually illustrating an example of corrected coordinate data.

FIG. 7B is a diagram conceptually illustrating an example of the corrected coordinate data.

FIG. 7C is a diagram conceptually illustrating an example of the corrected coordinate data.

FIG. 8 is a diagram illustrating an example of an operation procedure of an optical shaping apparatus 1 in FIG. 1.

FIG. 9A is a diagram illustrating an example of a process of producing the shaped article.

FIG. 9B is a diagram illustrating an example of a producing process following the process of FIG. 9A.

FIG. 9C is a diagram illustrating an example of a producing process following the process of FIG. 9B.

FIG. 9D is a diagram illustrating an example of a producing process following the process of FIG. 9C.

FIG. 10A is a diagram illustrating one form of the optical shaping apparatus in FIG. 1.

FIG. 10B is a diagram illustrating one form of the optical shaping apparatus in FIG. 1.

FIG. 10C is a diagram illustrating one form of the optical shaping apparatus in FIG. 1.

FIG. 10D is a diagram illustrating one form of the optical shaping apparatus in FIG. 1.

FIG. 11 is a diagram illustrating an example of a cross-sectional configuration of the shaped article.

FIG. 12 is a diagram illustrating a modification example of the optical shaping apparatus in FIG. 1.

FIG. 13 is a diagram illustrating an example of the cross-sectional configuration of the shaped article.

FIG. 14 is a diagram illustrating a modification example of the optical shaping apparatus in FIG. 1.

FIG. 15 is a diagram illustrating a modification example of the cross-sectional diagram of the shaped article.

FIG. 16 is a diagram illustrating a modification example of the cross-sectional configuration of the shaped article.

FIG. 17 is a diagram illustrating an example of a transmissive liquid crystal panel.

FIG. 18 is a diagram illustrating an example of a reflective liquid crystal panel.

MODES FOR CARRYING OUT THE INVENTION

Some embodiments of the technology are described in detail below with reference to drawings. Note that description is given in the following order.
1. Embodiment (optical shaping apparatus)
2. Modification examples (optical shaping apparatus)

Modification example A: an example in which coordinate data is corrected also during light emission Modification example B: an example utilizing an electronic apparatus such as a smartphone Modification example C: an example in which a shaped article is separated into a plurality of pieces on an object surface Modification example D: an example in which a light emitting device for peeling of a shaped article is provided Modification example E: an example in which a heater for peeling of a shaped article is provided Modification example F: an example in which an object surface is a surface other than a surface of a nail Modification example G: an example in which a shaped article is colored Modification example H: an example in which an electronic device, etc. are incorporated in a shaped article Modification example I: an example in which a photosensitive resin includes a positive resin Modification example J: an example in which a shaped article has a thin sheet shape Modification example K: an example using a transmissive liquid crystal panel Modification example L: an example using a reflective liquid crystal panel

1. EMBODIMENT

[Configuration]

First, an optical shaping apparatus 1 according to an embodiment of the technology is described. FIG. 1 illustrates an example of a schematic configuration of the optical shaping apparatus 1. The optical shaping apparatus 1 is an apparatus that performs exposure on a surface (object surface St) of a photosensitive resin applied on a surface of an object-to-be-stacked 100, and is an apparatus that forms a shaped article with use of transformation of the resin caused by light irradiation. The object surface St corresponds to a specific example of an "object surface" in the technology.

The object-to-be-stacked 100 is, for example, a thumb 111 as illustrated in FIG. 2A or four fingers (an index finger 112, a middle finger 113, an annular finger 114, and a little finger 115) as illustrated in FIG. 2B. The object-to-be-stacked 100 may be, for example, an electronic apparatus such as a smartphone. In a case where the object-to-be-stacked 100 is the thumb 111 as illustrated in FIG. 2A, the object surface St is, for example, a surface of a photosensitive resin applied on a surface of a nail 111A of the thumb 111. In a case where the object-to-be-stacked 100 is the four fingers as illustrated in FIG. 2B, the object surface St is, for example, a surface of the photosensitive resin applied on the surface of each of nails 112A, 113A, 114A, and 115A of the four fingers.

Before start of the light irradiation, the object surface St is the surface of the photosensitive resin applied on, for example, the surface of the nail 111A. After stacking of a portion of the shaped article on the surface of the nail 114A or the like is started, the object surface St is the surface of the photosensitive resin applied on an uneven surface including a structure in the middle of the stacking.

For example, the optical shaping apparatus 1 includes a light source 10, a DMD (Digital Mirror Device) 20, a sensor 30, a driver 40, a controller 50, a memory 60, and a lens 70, as illustrated in FIG. 1. The optical shaping apparatus 1 corresponds to a specific example of an "optical shaping apparatus" in the technology. The light source 10 corresponds to a specific example of a "light source" in the technology. The DMD 20 corresponds to a specific example of an "optical function section" in the technology. The sensor 30 corresponds to a specific example of a "sensor" in the technology. The controller 50 corresponds to a specific example of a "controller" in the technology.

The light source 10 outputs diffusion light or converging light as outgoing light Lo1 on the basis of a drive signal from the driver 40. In a case where the light source 10 outputs diffusion light as the outgoing light Lo1, the light source 10 includes a light emitting device 11 that outputs ultraviolet light as the diffusion light, for example, as illustrated in FIG. 3A. In a case where the light source 10 outputs converging light as the outgoing light Lo1, the light source 10 includes the light emitting device 11 and a convex lens 12 that is disposed at a predetermined position in an optical path of the light from the light emitting device 11, for example, as illustrated in FIG. 3B. The convex lens 12 collects the light emitted from the light emitting device 11 to generate converging light. Note that the converging light may be generated by an optical component other than the convex lens 12.

The light emitting device 11 includes, for example, one or a plurality of semiconductor lasers, or one or a plurality of light emitting diodes. Each of the semiconductor lasers may be a common semiconductor laser or a special laser such as a SHG (Second Harmonic Generation) laser. Each of the light emitting diodes may be a common light emitting diode or a special light emitting diode such as a super luminescent diode (SLD). The semiconductor laser or the light emitting diode outputting ultraviolet light includes, for example, a GaInN semiconductor that allows for outputting of light of 405 nm band. The semiconductor laser outputting ultraviolet light is configured by stacking an n-type AlGaN clad layer, an n-type GaN guide layer, a GaInN multiple quantum well layer, a p-type AlGaN electron block layer, a p-type GaN guide layer, a p-type AlGaN clad layer, and a p-type GaN contact layer on an n-type GaN substrate. Typically, a beam spot diameter of the semiconductor laser is smaller than a beam spot diameter of the light emitting diode. Therefore, in a case where one or a plurality of semiconductor lasers are used as the light emitting device 11, it is possible to easily achieve high energy density because of extremely small beam spot diameter of the light emitting device 11. Further, in a case where one or a plurality of semiconductor lasers or one or a plurality of light emitting diodes are used as the light emitting device 11, it is possible to easily downsize the light emitting device 11 as compared with a case where a lamp is used as the light emitting device 11.

For example, the DMD 20 includes a plurality of movable mirrors 20A that are two-dimensionally arranged, as illustrated in FIG. 4. The plurality of movable mirrors 20A correspond to a specific example of a "plurality of reflectors" in the technology. Each of the movable mirrors 20A is disposed in the optical path of the outgoing light Lo1 from the light source 10, and reflects the entered outgoing light Lo1. The DMD 20 modulates (displaces) the optical path of the light entering each of the movable mirrors 20A. Specifically, the DMD 20 reflects the outgoing light Lo1 entering each of the movable mirrors 20A. The DMD 20 reflects the outgoing light Lo1 from the light source 10 by each of the movable mirrors 20A displaced on the basis of the drive signal from the driver 40, thereby displacing luminance distribution of the outgoing light Lo1 (reflected light Lr1) on the object surface St. The reflected light Lr1 corresponds to a specific example of "modulated light" in the technology.

The sensor 30 acquires positional data Ds of a predetermined surface including the object surface St, and outputs the positional data Ds to the controller 50. The positional data Ds is three-dimensional coordinate data of the predetermined surface including the object surface St. For example, the positional data Ds is the three-dimensional coordinate data of the predetermined surface including the object surface St, as conceptually illustrated in FIG. 5A. Accordingly, the sensor 30 dissolves the predetermined surface including the object surface St into a plurality of elements, and acquires the three-dimensional coordinate of each of the dissolved elements. Note that the positional data Ds may be a set of the three-dimensional coordinates of only the object surface St. In this case, for example, the positional data Ds is the three-dimensional coordinate data of only the object surface St, as conceptually illustrated in FIG. 5B. The sensor 30 dissolves only the object surface St into a plurality of elements, and acquires the three-dimensional coordinate of each of the dissolved elements.

The sensor 30 is an imaging unit that is allowed to image a region including the object surface St. The imaging unit is, for example, a twin-lens camera, and outputs a stereo image (image data 30A) acquired by the twin-lens camera to the controller 50. Note that the imaging unit may be a single lens camera. In this case, however, the imaging unit outputs image data (image data 30A) acquired by the single lens camera to the controller 50.

The driver 40 drives the light source 10, the DMD 20, and the sensor 30 on the basis of a control signal from the controller 50. The memory 60 is configured so as to be allowed to hold, for example, coordinate data Dt. An apparatus including the memory 60 and the controller 50 includes an electronic apparatus (hereinafter, appropriately referred to as "electronic apparatus") such as a smartphone. The coordinate data Dt represents a shape and a size of a shaped article 200 as illustrated in FIG. 6A as a plurality of pieces of coordinate data. Moreover, the coordinate data Dt may include color information associated with each of the coordinate data. In a case where it is considered that the shaped article 200 includes a plurality of thin cross-sectional pieces 210 that are obtained by slicing the shaped article 200, the shape and the size of each of the cross-sectional pieces 210 are represented by, for example, horizontal cross-sectional data Dthi. In other words, for example, the coordinate data Dt include a plurality of pieces of horizontal cross-sectional data Dthi, as conceptually illustrated in FIG. 6B. The horizontal cross-sectional data Dthi may include a plurality of pieces of three-dimensional coordinate data or a plurality of pieces of two-dimensional coordinate data. In a case where the horizontal cross-sectional data Dthi includes the plurality of pieces of two-dimensional coordinate data, however, the horizontal cross-sectional data Dthi is preferably associated with height direction information in the shaped article 200 by any method.

The controller 50 controls the light source 10, the DMD 20, and the sensor 30 through the driver 40. The controller 50 controls operation of the DMD 20 through the driver 40 to apply the reflected light Lr1 generated by the DMD 20 to the object surface St. Specifically, the controller 50 displaces each of the movable mirrors 20A through the driver 40, and displaces the optical path by each of the movable mirrors 20A, thereby applying the reflected light Lr1 to the object surface St. The controller 50 derives the positional data Ds on the basis of the image data 30A acquired by the sensor 30.

The controller 50 controls operation of each of the movable mirrors 20A on the basis of the positional data Ds and the coordinate data Dt. The controller 50 controls the operation of each of the movable mirrors 20A on the basis of the positional data Ds acquired before the light emitter 10 emits light, and the coordinate data Dt. Specifically, the control section 50 corrects the coordinate data Dt on the basis of the positional data Ds that is acquired before the light emitter 10 emits light, and controls the operation of each of the movable mirrors 20A on the basis of coordinate data Dt' obtained through the correction.

For example, the controller 50 may perform correction to omit a portion of the coordinate data Dt on the basis of the positional data Ds, as illustrated in FIG. 7A. At this time, the coordinate data Dt' obtained through the correction is similar to the coordinate data Dt in that the coordinate data Dt' includes the plurality of pieces of horizontal cross-sectional data Dthi but corresponds to data in which data of a portion corresponding to a bottom part is lacked from the coordinate data Dt. For example, the controller 50 may perform correction to add dummy data to the coordinate data Dt on the basis of the positional data Ds, as illustrated in FIG. 7B. At this time, the coordinate data Dt' obtained through the correction is similar to the coordinate data Dt in that the coordinate data Dt' includes the plurality of pieces of horizontal cross-sectional data Dthi but corresponds to data in which the dummy data is added to the bottom part of the coordinate data Dt. For example, the controller 50 may correct the coordinate data Dt to a plurality of pieces of following cross-sectional data Dtci along the surface shape of the object surface St on the basis of the positional data Ds, as illustrated in FIG. 7C. For example, the controller 50 may correct the horizontal cross-sectional data Dthi to the following cross-sectional data Dtci along the surface shape of the object surface St on the basis of the positional data Ds. The coordinate data Dt' includes the plurality of pieces of following cross-sectional data Dtci that are obtained through the correction. The controller 50 controls light emission of the light source 10 on the basis of the coordinate data Dt' obtained though the correction as described above. The coordinate data Dt' corresponds to a specific example of "corrected coordinate data" in the technology. Note that the following cross-sectional data Dtci is preferably strictly along the surface shape of the object surface St; however, the following cross-sectional data Dtci may be curved cross-sectional data substantially along the surface shape of the object surface St. Note that the controller 50 may or may not control the light emission of the light source 10 on the basis of the positional data Ds and the coordinate data Dt.

The lens 70 collects the reflected light Lr1 from the DMD 20, and forms an image on or near the object surface St. The optical shaping apparatus 1 may include a mechanism to adjust an image forming position of the lens 70.

[Operation]

Next, an example of a procedure of producing the shaped article 200 with use of the optical shaping apparatus 1 is described. FIG. 8 illustrates an example of an operation procedure of the optical shaping apparatus 1. First, the optical shaping apparatus 1 acquires the coordinate data Dt (step S101). For example, a user selects a design of the shaped article 200 and inputs the coordinate data Dt of the selected design to the optical shaping apparatus 1. Alternatively, the user draws a design by oneself and inputs the coordinate data Dt of the drawn design to the optical shaping apparatus 1. The optical shaping apparatus 1 acquires the coordinate data Dt through selection by the user, for example, in the above-described manner. In addition, the optical shaping apparatus 1 acquires the coordinate data Dt through input by the user, for example, in the above-described manner.

In a case where the apparatus including the memory 60 and the controller 50 includes the electronic apparatus such as a smartphone, the optical shaping apparatus 1 may display a plurality of designs on a screen of the electronic apparatus, and may cause the user to select one of the designs. The optical shaping apparatus 1 may download the coordinate data Dt of the design selected by the user, through the Internet. In addition, in a case where the screen of the electronic apparatus includes a touch input function, the optical shaping apparatus 1 may cause the user to draw a design on the screen of the electronic apparatus, thereby receiving input of the design by the user. At this time, the optical shaping apparatus 1 may generate the coordinate data Dt on the basis of the design inputted by the user.

Next, the user applies a photosensitive resin 210A that contains a color pigment or dye on, for example, the surface of the nail 111A of the thumb 111 (FIG. 9A). For example, the photosensitive resin 210A is a resin to be cured by at least the ultraviolet light outputted from the light emitting device 11. In a case where the optical shaping apparatus 1 includes a mechanism to apply the photosensitive resin 210A on the object-to-be-stacked 100, the optical shaping apparatus 1 may apply the photosensitive resin 210A on, for example, the surface of the nail 111A of the thumb 111 in accordance with an application request of the photosensitive resin from the user.

Next, the user requests treatment for the photosensitive resin 210A to the optical shaping apparatus 1 while the user inserts the thumb 111 into a predetermined place of the optical shaping apparatus 1. When the instruction of the treatment for the photosensitive resin 210A is inputted by the user, the optical shaping apparatus 1 controls the light emission of the light source 10 on the basis of the positional data Ds and the coordinate data Dt.

Specifically, first, the optical shaping apparatus 1 acquires the positional data Ds before the light emitter 10 emits light (step S102). Next, the optical shaping apparatus 1 corrects the coordinate data Dt on the basis of the positional data Ds acquired before the light emitter 10 emits light (step S103). The optical shaping apparatus 1 performs, for example, the above-described correction (e.g., see FIG. 7A, FIG. 7B, or FIG. 7C) on the coordinate data Dt to derive the coordinate data Dt' from the coordinate data Dt. At this time, as necessary, the optical shaping apparatus 1 may perform correction corresponding to expansion, reduction, and adjustment in aspect ratio of the shaped article 200, on the coordinate data Dt or the coordinate data Dt'.

In the case where the apparatus including the memory 60 and the controller 50 is configured of an electronic apparatus such as a smartphone, the optical shaping apparatus 1 may display, on the screen of the electronic apparatus, an image (hereinafter, referred to as "image for adjustment") that allows the user to intuitively understand the position and the size of the shaped article 200 to be formed on the nail 111A. For example, the optical shaping apparatus 1 may display, on the screen of the electronic apparatus, an image (image for adjustment) in which the image of the shaped article 200 generated on the basis of the coordinate data Dt is overlaid on the image of the nail 111A generated on the basis of the positional data Ds. In a case where the optical shaping apparatus 1 includes the imaging unit that images the object surface St, the optical shaping apparatus 1 may display, for example, on the screen of the electronic apparatus, an image (image for adjustment) in which the image of the shaped article 200 generated on the basis of the coordinate data Dt is overlaid on an image of the nail 111A that is imaged by the above-described imaging unit. The imaging unit that images the object surface St may be provided in the electronic apparatus. Note that the above-described imaging unit is, for example, a CMOS (Complementary Metal Oxide Semiconductor) image sensor or a CCD (Charge Coupled Device) image sensor. Further, the optical shaping apparatus 1 may adjust the position where the shaped article 200 is to be formed, and the size, the aspect ratio, etc. of the shaped article 200 in accordance with the input by the user while displaying the image for adjustment.

Next, the optical shaping apparatus 1 controls the operation of the DMD 20 on the basis of the positional data Ds acquired before the light emitter 10 emits light, and the coordinate data Dt. Specifically, the optical shaping apparatus 1 controls the operation of the DMD 20 on the basis of the coordinate data Dt' (step S104). More specifically, the optical shaping apparatus 1 controls the operation of the DMD 20 on the basis of the horizontal cross-sectional data Dthi or the following cross-sectional data Dtci. The optical shaping apparatus 1 thus displaces the optical path of the light (outgoing light Lo1) outputted from the light source 10 by the DMD 20, to generate the reflected light Lr1. As a result, the optical shaping apparatus 1 applies the reflected light Lr1 to the surface (object surface St) of the photosensitive resin 210A applied on the object-to-be-stacked 100, thereby forming a cured resin layer 210B (FIG. 8B).

Upon completion of the light irradiation by the DMD 20, the optical shaping apparatus 1 notifies the user of completion of the treatment for the photosensitive resin 210A. The user confirms the notification, and then removes uncured photosensitive resin 210A by wiping with alcohol (such as ethanol).

In a case where production of the shaped article 200 is not completed, the user applies a photosensitive resin 210C containing a color pigment or dye on the cured resin layer 210B (FIG. 9C). The photosensitive resin 210C is, for example, a resin to be cured by at least ultraviolet light outputted from the light emitting device 11. In a case where the optical shaping apparatus 1 includes a mechanism to apply the photosensitive resin 210C on the surface including the cured resin layer 210B, the optical shaping apparatus 1 may apply the photosensitive resin 210C on, for example, the surface including the cured resin layer 210B in accordance with an application request of the photosensitive resin 210C from the user.

Next, the user reinserts the thumb 111 into the predetermined place of the optical shaping apparatus 1, and then requests treatment for the photosensitive resin 210C to the optical shaping apparatus 1. In a case where the instruction of the treatment for the photosensitive resin 210C is inputted by the user, the optical shaping apparatus 1 performs the above-described step S104 again. For example, the optical shaping apparatus 1 displaces the optical path of the light (outgoing light Lo1) outputted from the light source 10 by the DMD 20, to generate the reflected light Lr1, on the basis of the horizontal cross-sectional data Dthi different from the data in the preceding process or the following cross-sectional data Dtci different from the data in the preceding process. As a result, the optical shaping apparatus 1 applies the reflected light Lr1 to the surface (object surface St) of the photosensitive resin 210C newly applied on the cured resin layer 210B, thereby forming a cured resin layer 210D (FIG. 8D).

The optical shaping apparatus 1 may perform the above-described step S102 and the above-described step S103 again after applying the photosensitive resin 210C. In this case, however, the optical shaping apparatus 1 determines whether the positional data Ds that is acquired again before the light emitter 10 emits light (hereinafter, referred to as "updated data") is matched with the horizontal cross-sectional data Dthi or the following cross-sectional data Dtci that is to be used in the light emission control (hereinafter, referred to as "data to be used") in the above-described step S104. For example, the optical shaping apparatus 1 determines whether difference between XY coordinates (coordinates in front and back, and right and left directions) of a profile of the object surface St included in the updated data and XY coordinates (coordinates in front and back, and right and left directions) of a profile of the shaped article 200 included in the data to be used is within a predetermined range. Alternatively, the optical shaping apparatus 1 determines whether, for example, difference between a Z coordinate (coordinate in height direction) of the object surface St included in the updated data and a Z coordinate (coordinate in height direction) of the shaped article 200 included in the data to be used is within a predetermined range. Alternatively, the optical shaping apparatus 1 executes the above-described two determinations. In a case where the determination result indicates mismatch, the optical shaping apparatus 1 corrects the horizontal cross-sectional data Dthi to be used or the following cross-sectional data Dtci to be used such that the positional data Ds newly acquired is matched with the horizontal cross-sectional data Dthi to be used or the following cross-sectional data Dtci to be used. In a case where the determination result indicates matching, the optical shaping apparatus does not perform correction on the horizontal cross-sectional data Dthi to be used or the following cross-sectional data Dtci to be used.

[Effects]

Next, effects of the method of producing the optical shaping apparatus 1 are described.

In a case where the optical shaped article is produced in several stages, moving (shifting) the printing surface during the production makes it difficult to produce the optical shaped article in a desired shape by the existing method. In contrast, in a case where the ultraviolet rays are widely applied inside a housing, it is possible to produce the optical shaped article in the desired shape even if the printing surface is moved (shifted) during the production. In such a case, however, the ultraviolet rays are applied to a portion not needing light irradiation. Accordingly, in a case where the optical shaped article is formed on a nail, the ultraviolet rays are applied to a portion other than the nail, which causes large burden to a human body.

In contrast, in the present embodiment, the operation of the DMD 20 is controlled on the basis of the positional data Ds of the object surface St and the coordinate data Dt of the shaped article 200, which causes the reflected light Lr1 generated by the DMD 20 to be applied to the object surface St. This makes it possible to prevent the light from being applied to a portion not needing light irradiation. In addition, the position of the object surface St is measured by the sensor 30 in the present embodiment. Therefore, even in a case where the object surface St is moved (shifted) in the middle of the production of the shaped article 200, the sensor 30 measures the position of the object surface St again at that time, which makes it possible to perform light irradiation in consideration of the shifting. As a result, it is possible to produce the shaped article 200 in several stages while suppressing adverse effects to a person and goods.

Moreover, since the DMD 20 is used in the present embodiment, it is possible to produce the shaped article 200 in a short time as compared with a case where the shaped article 200 is produced through beam scanning of ultraviolet light.

Further, in the present embodiment, in the case where the light emitting device 11 includes one or a plurality of semiconductor lasers, it is possible to easily achieve high energy density because of extremely small beam spot diameter of the light emitting device 11. This allows for transformation of the photosensitive resin in a short time, and to produce the shaped article 200 with higher definition.

2. MODIFICATION EXAMPLES

Modification Example A

In the above-described embodiment, the optical shaping apparatus 1 acquires the positional data Ds only before the light emitter 10 emits light. The optical shaping apparatus 1, however, may also acquire the positional data Ds while the light emitter 10 emits light. In such a case, it is possible for the optical shaping apparatus 1 to control the operation of the DMD 20 on the basis of the positional data Ds acquired while the light emitter 10 emits light, and the coordinate data Dt. Specifically, first, in step S104, the optical shaping apparatus 1 acquires the positional data Ds at each predetermined timing while the light emitter 10 emits light. Next, the optical shaping apparatus 1 determines whether the positional data Ds acquired while the light emitter 10 emits light is matched with the positional data Ds acquired before the light emitter 10 emits light. The determination method is similar to the determination method in the above-described embodiment. As a result, in a case where the determination result indicates mismatch, the optical shaping apparatus 1 corrects the horizontal cross-sectional data Dthi in use or the following cross-sectional data Dtci in use such that the positional data Ds acquired while the light emitter 10 emits light is matched with the horizontal cross-sectional data Dthi in use or the following cross-sectional data Dtci in use. The correction method is similar to the correction method in the above-described embodiment. In a case where the determination result indicates matching, the optical shaping apparatus 1 does not correct the horizontal cross-sectional data Dthi in use or the following cross-sectional data Dtci in use.

As described above, in the present modification example, the positional data Ds is acquired not only before the light emitter 10 emits light but also while the light emitter 10 emits light, and the horizontal cross-sectional data Dthi or the following cross-sectional data Dtci is corrected on the basis of the acquired positional data Ds. Accordingly, even in a case where the object surface St is moved (shifted) during irradiation with the reflected light Lr1, it is possible to cause transformation of the desired part of the photosensitive resin applied to the object-to-be-stacked 100 with high accuracy. This makes it possible to form the shaped article 200 with high accuracy even in the case where the object surface St is moved (shifted) during the irradiation of the reflected light Lr1.

Modification Example B

In the embodiment and the modification example thereof described above, the sensor 30, the function of driving the sensor 30 among the functions of the driver 40, all or some of the functions of the controller 50, and the memory 60 may be configured by the electronic apparatus such as a smartphone.

FIG. 10A illustrates an example of the schematic configuration of the optical shaping apparatus 1 according to the present modification example. In FIG. 10A, the driver 40 includes a driver 40A that drives the light source 10 and the DMD 20, and a driver 40B that drives the sensor 30. The driver 40A and the driver 40B are provided separately from each other. For example, the sensor 30, the driver 40B, the controller 50, and the memory 60 are configured by an electronic apparatus 80 such as a smartphone. The controller 50 includes a function of communicating with the driver 40A. The driver 40A has a function of communicating with the controller 50. The optical shaping apparatus 1 illustrated in FIG. 10A includes, for example, a slot (e.g., a slot 1C illustrated in FIG. 10C) that detachably supports the electronic apparatus 80 or a placing table (e.g., a placing table 1D illustrated in FIG. 10D) on which the electronic apparatus 80 is placed.

It is possible for the optical shaping apparatus 1 illustrated in FIG. 10A to perform the operation similar to the operation of the optical shaping apparatus 1 according to the above-described embodiment in a case where the electronic apparatus 80 is loaded to the slot (e.g., the slot 1C illustrated in FIG. 10C) or placed on the placing table (e.g., the placing table 1D illustrated in FIG. 10D). This makes it possible to use, for example, the electronic apparatus 80 provided by the user in place of the sensor 30, the driver 40B, the controller 50, and the memory 60. As a result, it is possible to inexpensively manufacture the optical shaping apparatus 1.

FIG. 10B illustrates another example of the schematic configuration of the optical shaping apparatus 1 according to the present modification example. In FIG. 10B, the driver 40 includes the driver 40A and the driver 40B, and further, the controller 50 includes a controller 50A that controls the driver 40A, and a controller 50B that controls the driver 40B. The controller 50A and the controller 50B are provided separately from each other. The controller 50B controls operation of the controller 50A. The sensor 30, the driver 40B, the controller 50B, and the memory 60 are configured by an electronic apparatus 90 such as a smartphone. The controller 50A has a function of communicating with the controller 50B. The controller 50B has a function of communicating with the controller 50A. The optical shaping apparatus 1 illustrated in FIG. 10B includes a slot (e.g., the slot 1C illustrated in FIG. 10C) that detachably supports the electronic apparatus 90 or a placing table (e.g., the placing table 1D illustrated in FIG. 10D) on which the electronic apparatus 90 is placed. The slot 1C or the placing table 1D is provided in a housing 1A of the optical shaping apparatus 1. The housing 1A corresponds to a specific example of a "first housing" in the technology. For example, an opening (finger insertion port 1B) into which a finger of a user is inserted is provided in the housing 1A of the optical shaping apparatus 1, in addition to the slot 1C or the placing table 1D.

It is possible for the optical shaping apparatus 1 illustrated in FIG. 10B to perform the operation similar to the operation of the optical shaping apparatus 1 according to the above-described embodiment in a case where the electronic apparatus 90 is loaded to the slot (e.g., the slot 1C illustrated in FIG. 10C) or placed on the placing table (e.g., the placing table 1D illustrated in FIG. 10D). This makes it possible to use, for example, the electronic apparatus 90 provided by the user in place of the sensor 30, the driver 40B, the controller 50B, and the memory 60. As a result, it is possible to inexpensively manufacture the optical shaping apparatus 1.

Note that, in FIG. 10C and FIG. 10D, the slot 1C or the placing table 1D is provided in the housing 1A of the optical shaping apparatus 1. For example, the opening (finger insertion port 1B) into which the finger of the user is inserted is provided in the housing 1A, in addition to the slot 1C or the placing table 1D. In FIG. 10A, the housing 1A protects the light source 10, the DMD 20, and the driver 40A. In FIG. 10B, the housing 1A protects the light source 10, the DMD 20, the driver 40A, and the controller 50A.

In contrast, the electronic apparatus 90 includes a housing 90A that protects the sensor 30, the driver 40B, the controller 50B, and the memory 60. The electronic apparatus 80 includes a housing 80A that protects the sensor 30, the driver 40B, the controller 50B, and the memory 60. The housing 80A or 90A and the housing 1A are configured separately from each other. The housing 80A or 90A correspond to a specific example of a "second housing" in the technology.

Modification Example C

FIG. 11 illustrates an example of a cross-sectional configuration of the shaped article 200, together with the thumb 111 and the object surface 111A. In the embodiment and the modification examples A to C thereof described above, the shaped article 200 is a single solid article. The shaped article 200, however, may include articles separately provided at a plurality of positions on the object surface 111A, for example, as illustrated in FIG. 11.

Modification Example D

FIG. 12 illustrates a modification example of the schematic configuration of the optical shaping apparatus 1. In the embodiment and the modification examples thereof described above, the light source 10 may further include a light emitting device 13 and a dichroic mirror 14. The light emitting device 13 outputs light of a wavelength band different from the wavelength band of the light emitting device 11. The dichroic mirror 14 is disposed in an optical path of the light outputted from the light emitting device 13. The dichroic mirror 14 is disposed also in the optical path of the light outputted from the light emitting device 11. The dichroic mirror 14 allows the light outputted from the light emitting device 11 to pass therethrough, and reflects the light outputted from the light emitting device 13 toward the DMD 20. The light source 10 may include the above-described lens 12 in the optical path of the light outputted from the light emitting device 11 or in the optical path of the light outputted from the light emitting device 13.

The light outputted from the light emitting device 11 is, for example, light that causes transformation of the photosensitive resin used for production of the shaped article 200. The light outputted from the light emitting device 13 is, for example, light that passes through the optical shaped article 200 and softens a light softening resin layer 200A illustrated in FIG. 13. The light softening resin layer 200A is formed in contact with the nail 111A, and is provided at the lowermost part of the shaped article 200. The optical shaping apparatus 1 reflects the light outputted from the light emitting device 13 by the DMD 20, and applies the light reflected by the DMD 20 to the light softening resin layer 200A, thereby softening the light softening resin layer 200A. The light softening resin layer 200A is softened, which allows the shaped article 200 to be easily peeled off from the nail 111A.

As described above, in the present modification example, the light emitting device 13 for peeling off the shaped article 200 is provided. This makes it possible to easily peel off the shaped article 200 from the object-to-be-stacked 100.

Note that, in the present modification example, the light emitting device 13 may output light having a two-photon absorption wavelength as the light to cause transformation of (soften or dissolve) the light softening resin layer 200A. The two-photon absorption is one non-linear optical phenomenon, and is a phenomenon in which two photons are absorbed at the same time to cause absorption corresponding to twice the energy of the applied light. Using the two-photon absorption makes it possible to soften the light softening resin layer 200A with use of light (e.g., near-infrared light) that has half the energy of ultraviolet light. Accordingly, the light emitting device 13 may be a device outputting near-infrared light. Note that the light source 10 may include a lens that condenses the light outputted from the light emitting device 13 into a beam spot shape in order to enhance photon density. The controller 50 applies, for example, the light of the light emitting device 13 to a plurality of positions in the light softening resin layer 200A. As a result, a starting point to peel off the light softening resin layer 200A by stress is formed at each of the plurality of positions to which the light of the light emitting device 13 has been applied in the light softening resin layer 200A. This allows the user to peel off the light softening resin layer 200A by stress after the light of the light emitting device 13 is applied to the light softening resin layer 200A. Accordingly, it is possible to easily peel off the shaped article 200 from the object-to-be-stacked 100 also in this case.

Modification Example E

FIG. 14 illustrates a modification example of the schematic configuration of the optical shaping apparatus 1. In the embodiment and the modification examples thereof described above, the optical shaping apparatus 1 may include a heater 110 that causes transformation (softening or dissolution) of a thermosoftening resin layer 200B illustrated in FIG. 15. The optical shaping apparatus 1 transmits heat outputted from the heater 110 to the thermosoftening resin layer 200B. As a result, transformation (softening or dissolution) of the thermosoftening resin layer 200B occurs. The transformation (softening or dissolution) of the thermosoftening resin layer 200B allows the shaped article 200 to be easily peeled off from the nail 111A.

As described above, in the present modification example, the heater 110 for peeling off the shaped article 200 is provided. This makes it possible to easily peel off the shaped article 200 from the object-to-be-stacked 100.

Modification Example F

In the embodiment and the modification examples thereof described above, the case where the object-to-be-stacked 100 is a finger of a person has been exemplified. The object-to-be-stacked 100, however, may be any other object. The object-to-be-stacked 100 may be, for example, an arm or a leg of a person, a nail tip, or an electronic apparatus such as a smartphone.

Modification Example G

In the embodiment and the modification examples thereof described above, the horizontal cross-sectional data Dthi or the following cross-sectional data Dtci may include color information in each piece of coordinate data. The color information is, for example, information related to three primary colors of a color material. In this case, for example, the optical shaping apparatus 1 first controls the operation of the DMD 20 in accordance with cyan color information included in the horizontal cross-sectional data Dthi or the following cross-sectional data Dtci in a state where a cyan photosensitive resin is applied to the object-to-be-stacked 100. Thereafter, for example, the optical shaping apparatus 1 controls the operation of the DMD 20 in accordance with magenta color information included in the horizontal cross-sectional data Dthi or the following cross-sectional data Dtci in a state where a magenta photosensitive resin is applied to the object-to-be-stacked 100. Thereafter, for example, the optical shaping apparatus 1 controls the operation of the DMD 20 in accordance with yellow color information included in the horizontal cross-sectional data Dthi or the following cross-sectional data Dtci in a state where a yellow photosensitive resin is applied to the object-to-be-stacked 100. For example, as necessary, the optical shaping apparatus 1 further controls the operation of the DMD 20 in accordance with white color information included in the horizontal cross-sectional data Dthi or the following cross-sectional data Dtci in a state where a white photosensitive resin is applied to the object-to-be-stacked 100.

As described above, in the present modification example, the shaped article 200 is produced on the basis of the color information included in the horizontal cross-sectional data Dthi or the following cross-sectional data Dtci. This makes it possible to color the shaped article 200.

Modification Example H

FIG. 16 illustrates a modification example of the cross-sectional configuration of the shaped article 200. In the present modification example, the shaped article 200 includes therein an electronic device 200C and a light emitting device 200D. The electronic device 200 is, for example, a wireless communication circuit. For example, it is assumed that the electronic device 200C and the light emitting device 200D are provided on the object surface St in the production process of the shaped article 200. In such a case, the optical shaping apparatus 1 may measure the uneven surface shape including the electronic device 200C and the light emitting device 200D by the sensor 30, and may generate the positional data Ds corresponding to the uneven surface shape including the electronic device 200C and the light emitting device 200D on the basis of the measurement data by the sensor 30. In a case where the optical shaping apparatus 1 generates the positional data Ds in such a manner, the optical shaping apparatus 1 corrects the coordinate data Dt on the basis of the generated positional data Ds, and controls the operation of the DMD 20 on the basis of the corrected coordinate data Dt'.

As described above, in the present modification example, even in the case where the electronic device 200C and the light emitting device 200D are provided on the object surface St in the production process of the shaped article 200, correction of the coordinate data Dt in consideration of the unevenness of the electronic device 200C and the light emitting device 200 D is performed. This makes it possible to reduce distortion of the shaped article 200 due to presence of the electronic device 200C and the light emitting device 200D.

Note that a photodetector, a motion sensor, or the like may be provided in place of the light emitting device 200D. In a case where the motion sensor is provided inside the shaped article 200, for example, it is possible to realize a game using an output of the motion sensor. In addition, a barcode in which individual information has been registered or a GPS transmitter may be provided in place of the electronic device 200C and the light emitting device 200D. In a case where the barcode in which the individual information has been registered is provided inside the shaped article 200, for example, it is possible to perform individual certification by holding the barcode in which the individual information has been registered over an external barcode reader. Further, in a case where the GPS transmitter is provided inside the shaped article 200, it is possible to track a person having the GPS transmitter by receiving positional information transmitted from the GPS transmitter by an external communication device.

Modification Example I

In the embodiment and the modification examples thereof described above, the case where the photosensitive resin is a resin cured by at least ultraviolet light has been exemplified. The photosensitive resin, however, may be a negative resin cured by light other than ultraviolet rays or a positive resin softened by light.

Modification Example J

In the embodiment and the modification examples thereof described above, the shaped article 200 may have a thin sheet shape. In this case, the coordinate data Dt may include a plurality of pieces of three-dimensional coordinate data each including height direction information equivalent to one another, or a plurality of pieces of two-dimensional coordinate data not including the height direction information. Even in a case where the coordinate data Dt has any of the above-described configurations, the controller 50 corrects, for example, the coordinate data Dti to the following coordinate data along the surface shape of the object surface St on the basis of the positional data Ds. Further, for example, the controller 50 controls the operation of the DMD 20 on the basis of the following coordinate data obtained through the correction.

Modification Example K

In the embodiment and the modification examples thereof described above, the optical shaping apparatus 1 may include, in place of the DMD 20, a light transmissive liquid crystal panel 21, for example, as illustrated in FIG. 17. The liquid crystal panel 21 corresponds to a specific example of a "transmissive liquid crystal panel" in the technology. The liquid crystal panel 21 includes, for example, HTPS (high-temperature polysilicon TFT liquid crystal). The liquid crystal panel 21 includes a plurality of light transmissive liquid crystal cells that are two-dimensionally arranged.

The liquid crystal panel 21 is disposed in the optical path of the outgoing light Lo1 outputted from the light source 10, and performs spatial light phase modulation of entered light (outgoing light Lo1). Specifically, the liquid crystal panel 21 modulates the phase of the outgoing light Lo1 by each of the liquid crystal cells, thereby controlling transmission and blocking of the outgoing light Lo1 for each of the liquid crystal cells. The liquid crystal panel 21 shifts the state of each of the liquid crystal cells on the basis of a drive signal from the driver 40 or the driver 40A, thereby displacing luminance distribution of transmissive light Lt1 of the liquid crystal panel 21, on the object surface St.

The driver 40 or the driver 40A drives the liquid crystal panel 21 on the basis of a control signal from the controller 50 or the controller 50A. The controller 50 or the controller 50A controls the liquid crystal panel 21 through the driver 40 or the driver 40A. The controller 50 or the controller 50A controls the spatial light phase modulation in the liquid crystal panel 21 on the basis of the positional data Ds and the coordinate data Dt. The controller 50 or the controller 50A controls the spatial light phase modulation in the liquid crystal panel 21 on the basis of the positional data Ds acquired before the light emitter 10 emits light, and the coordinate data Dt. Specifically, the controller 50 corrects the coordinate data Dt on the basis of the positional data Ds acquired before the light emitter 10 emits light, and controls the spatial light phase modulation in the liquid crystal panel 21 on the basis of the coordinate data Dt' obtained through the correction. The controller 50 or the controller 50A shifts the state of each of the liquid crystal cells on the basis of the coordinate data Dt' obtained through the above-described correction (including the correction described in the modification example J), and causes each of the liquid crystal cells to modulate the spatial light phase of the outgoing light Lo1, thereby displacing the luminance distribution of the transmissive light Lt1, on the object surface St.

In the present modification example, the controller 50 or the controller 50A may or may not control light emission of the light source 10 on the basis of the coordinate data Dt through the driver 40 or the driver 40A.

[Operation]

Next, an example of a procedure of producing the shaped article 200 with use of the optical shaping apparatus 1 according to the present modification example is described. Note that, in the present modification example, the procedure after the coordinate data Dt' is acquired is different from the procedure in each of the embodiment and the modification examples thereof described above. Therefore, in the following, the procedure after the coordinate data Dt' is acquired is described.

The optical shaping apparatus 1 controls the operation of the liquid crystal panel 21 on the basis of the positional data Ds acquired before the light emitter 10 emits light and the coordinate data Dt. Specifically, the optical shaping apparatus 1 performs the spatial light phase modulation by each of the liquid crystal cells of the liquid crystal panel 21 on the basis of the coordinate data Dt'. More specifically, the optical shaping apparatus 1 performs the spatial light phase modulation by each of the liquid crystal cells of the liquid crystal panel 21 on the basis of the horizontal cross-sectional data Dthi or the following cross-sectional data Dtci. The optical shaping apparatus 1 thus displaces the phase of the light (outgoing light Lo1) outputted from the light source 10 by the liquid crystal panel 21, thereby generating the transmissive light Lt1. As a result, the optical shaping apparatus 1 applies the transmissive light Lt1 to the surface (object surface St) of the photosensitive resin 210A applied on the object-to-be-stacked 100, thereby forming the cured resin layer 210B (FIG. 8B).

Upon completion of the light irradiation by the liquid crystal panel 21, the optical shaping apparatus 1 notifies the user of completion of the treatment for the photosensitive resin 210A. The user confirms the notification, and then removes the uncured photosensitive resin 210A by wiping with alcohol (e.g., ethanol).

In a case where the production of the shaped article 200 is not completed, the user applies the photosensitive resin 210C containing a color pigment or dye, for example, on the cured resin layer 210B (FIG. 8C). In the case where the optical shaping apparatus 1 includes the mechanism to apply the photosensitive resin 210C on the surface including the cured resin layer 210B, the optical shaping apparatus 1 may apply the photosensitive resin 210C, for example, on the surface including the cured resin layer 210B in accordance with an application request of the photosensitive resin 210C from the user.

Next, the user reinserts the thumb 111 into the predetermined place of the optical shaping apparatus 1, and then requests the treatment for the photosensitive resin 210C to the optical shaping apparatus 1. In a case where the instruction of the treatment for the photosensitive resin 210C is inputted by the user, the optical shaping apparatus 1 performs the above-described procedure again. For example, the optical shaping apparatus 1 displaces the phase of the light (outgoing light Lo1) outputted from the light source 10 by the liquid crystal panel 21, to generate the transmissive light Lt1, on the basis of the horizontal cross-sectional data Dthi different from the data in the preceding process or the following cross-sectional data Dtci different from the data in the preceding process. As a result, the optical shaping apparatus 1 applies the transmissive light Lt1 to the surface (object surface St) of the photosensitive resin 210C newly applied on the cured resin layer 210B, thereby forming the cured resin layer 210D (FIG. 8D).

The optical shaping apparatus 1 may perform the above-described step S102 and the above-described step S103 again after the photosensitive resin 210C is applied. In this case, however, the optical shaping apparatus 1 determines whether the positional data Ds that is acquired again before the light emitter 10 emits light (hereinafter, referred to as "updated data") is matched with the horizontal cross-sectional data Dthi or the following cross-sectional data Dtci that is to be used (hereinafter, referred to as "data to be used") in the control of the liquid crystal panel 21. The determination method is similar to the method described in the above-described embodiment.

[Effects]

Next, effects of the method of manufacturing the optical shaping apparatus 1 according to the present modification example are described. In the present modification example, the operation of the liquid crystal panel 21 is controlled on the basis of the positional data Ds of the object surface St and the coordinate data Dt of the shaped article 200, which causes the transmissive light Lt1 generated by the liquid crystal panel 21 to be applied to the object surface St. This makes it possible to prevent the light from being applied to a portion not needing light irradiation. In addition, in the present embodiment, the position of the object surface St is measured by the sensor 30. Therefore, even in the case where the object surface St is moved (shifted) in the middle of the production of the shaped article 200, the sensor 30 measures the position of the object surface St again at that time, which makes it possible to perform light irradiation in consideration of the shifting. As a result, it is possible to produce the shaped article 200 in several stages while suppressing adverse effects to a person and goods.

Moreover, since the liquid crystal panel 21 is used in the present modification example, it is possible to produce the shaped article 200 in a short time as compared with a case where the shaped article 200 is produced through beam scanning of ultraviolet light.

Modification Example L

In the embodiment and the modification examples thereof described above, the optical shaping apparatus 1 may include a light-reflective liquid crystal panel 22, for example, as illustrated in FIG. 18, in place of the DMD 20. The liquid crystal panel 22 corresponds to a specific example of a "reflective liquid crystal panel" in the technology. The liquid crystal panel 22 includes, for example, LCOS (Liquid Crystal On Silicon). The liquid crystal panel 22 includes a plurality of light-reflective liquid crystal cells that are two-dimensionally arranged.

The liquid crystal panel 22 is disposed in the optical path of the outgoing light Lo1 outputted from the light source 10, and performs the spatial light phase modulation on the entered light (outgoing light Lo1). Specifically, the liquid crystal panel 22 modulates the phase of the outgoing light Lo1 in each of the liquid crystal cells, thereby controlling reflection and blocking of the outgoing light Lo1 for each of the liquid crystal cells. The liquid crystal panel 22 shifts the state of each of the liquid crystal cells on the basis of the drive signal from the driver 40 or the driver 40A, thereby displacing luminance distribution of reflected light Lr2 of the liquid crystal panel 22, on the object surface St.

The driver 40 or the driver 40A drives the liquid crystal panel 22 on the basis of the control signal from the controller 50 or the controller 50A. The controller 50 or the controller 50A controls the liquid crystal panel 22 through the driver 40 or the driver 40A. The controller 50 or the controller 50A controls the spatial light phase modulation in the liquid crystal panel 22 on the basis of the positional data Ds and the coordinate data Dt. The controller 50 or the controller 50A controls the spatial light phase modulation in the liquid crystal panel 22 on the basis of the positional data Ds acquired before the light emitter 10 emits light, and the coordinate data Dt. Specifically, the controller 50 corrects the coordinate data Dt on the basis of the positional data Ds acquired before the light emitter 10 emits light, and controls the spatial light phase modulation in the liquid crystal panel 22 on the basis of the coordinate data Dt' obtained through the correction. The controller 50 or the controller 50A shifts the state of each of the liquid crystal cells on the basis of the coordinate data Dt' obtained through the above-described correction (including correction described in modification example J), and causes each of the liquid crystal cells to modulate the spatial light phase of the outgoing light Lo1, thereby displacing the luminance distribution of the reflected light Lr2, on the object surface St.

In the present modification example, the controller 50 or the controller 50A may or may not control the light emission of the light source 10 on the basis of the coordinate data Dt through the driver 40 or the driver 40A.

[Operation]

Next, an example of the procedure of producing the shaped article 200 with use of the optical shaping apparatus 1 according to the present modification example is described. Note that, in the present modification example, the procedure after the coordinate data Dt' is acquired is different from the procedure in each of the embodiment and the modification examples thereof described above. Therefore, in the following, the procedure after the coordinate data Dt' is acquired is described.

The optical shaping apparatus 1 controls the operation of the liquid crystal panel 22 on the basis of the positional data Ds acquired before the light emitter 10 emits light, and the coordinate data Dt. Specifically, the optical shaping apparatus 1 performs the spatial light phase modulation by each of the liquid crystal cells of the liquid crystal panel 22 on the basis of the coordinate data Dt'. More specifically, the optical shaping apparatus 1 performs the spatial light phase modulation by each of the liquid crystal cells of the liquid crystal panel 22 on the basis of the horizontal cross-sectional data Dthi or the following cross-sectional data Dtci. The optical shaping apparatus 1 thus displaces the phase of the light (outgoing light Lo1) generated by the liquid crystal panel 22 by the liquid crystal panel 22, thereby generating the reflected light Lr2. As a result, the optical shaping apparatus 1 applies the reflected light Lr2 to the surface (object surface St) of the photosensitive resin 210A applied on the object-to-be-stacked 100, thereby forming the cured resin layer 210B (FIG. 8B).

Upon completion of the light irradiation by the liquid crystal panel 22, the optical shaping apparatus 1 notifies the user of completion of the treatment for the photosensitive resin 210A. The user confirms the notification, and then removes the uncured photosensitive resin 210A by wiping with alcohol (e.g., ethanol).

In a case where the production of the shaped article 200 is not completed, the user applies the photosensitive resin 210C containing a color pigment or dye, for example, on the cured resin layer 210B (FIG. 8C). In the case where the optical shaping apparatus 1 includes the mechanism to apply the photosensitive resin 210C on the surface including the cured resin layer 210B, the optical shaping apparatus 1 may apply the photosensitive resin 210C, for example, on the surface including the cured resin layer 210B in accordance with an application request of the photosensitive resin 210C from the user.

Next, the user reinserts the thumb 111 into the predetermined place of the optical shaping apparatus 1, and then requests the treatment for the photosensitive resin 210C to the optical shaping apparatus 1. In a case where the instruction of the treatment for the photosensitive resin 210C is inputted by the user, the optical shaping apparatus 1 performs the above-described procedure again. For example, the optical shaping apparatus 1 displaces the phase of the light (outgoing light Lo1) outputted from the light source 10 by the liquid crystal panel 21, to generate the reflected light Lr2, on the basis of the horizontal cross-sectional data Dthi different from the data in the preceding process or the following cross-sectional data Dtci different from the data in the preceding process. As a result, the optical shaping apparatus 1 applies the reflected light Lr2 to the surface (object surface St) of the photosensitive resin 210C newly applied on the cured resin layer 210B, thereby forming the cured resin layer 210D (FIG. 8D).

The optical shaping apparatus 1 may perform the above-described step S102 and the above-described step S103 again after the photosensitive resin 210C is applied. In this case, however, the optical shaping apparatus 1 determines whether the positional data Ds that is acquired again before the light emitter 10 emits light (hereinafter, referred to as "updated data") is matched with the horizontal cross-sectional data Dthi or the following cross-sectional data Dtci that is to be used (hereinafter, referred to as "data to be used") in the control of the liquid crystal panel 22. The determination method is similar to the method described in the above-described embodiment.

[Effects]

Next, effects of the method of manufacturing the optical shaping apparatus 1 according to the present modification example are described. In the present modification example, the operation of the liquid crystal panel 22 is controlled on the basis of the positional data Ds of the object surface St and the coordinate data Dt of the shaped article 200, which causes the reflected light Lr2 generated by the liquid crystal panel 22 to be applied to the object surface St. This makes it possible to prevent the light from being applied to a portion not needing light irradiation. In addition, in the present embodiment, the position of the object surface St is measured by the sensor 30. Therefore, even in the case where the object surface St is moved (shifted) in the middle of the production of the shaped article 200, the sensor 30 measures the position of the object surface St again at that time, which makes it possible to perform light irradiation in consideration of the shifting. As a result, it is possible to produce the shaped article 200 in several stages while suppressing adverse effects to a person and goods.

Moreover, since the liquid crystal panel 22 is used in the present modification example, it is possible to produce the shaped article 200 in a short time as compared with the case where the shaped article 200 is produced through beam scanning of ultraviolet light.

Hereinbefore, although the technology has been described with reference to the embodiment and the modification examples thereof, the technology is not limited to the above-described embodiment and the like, and may be variously modified. Note that the effects described in the present specification are illustrative. The effects achieved by the technology are not limited to the effects described in the present specification. The technology may achieve effects other than the effects described in the present specification.

Moreover, the technology may have the following configurations.

(1)

An optical shaping apparatus, including:

a light source that outputs diffusion light or converging light as outgoing light;

an optical function section that is disposed in an optical path of the outgoing light and modulates the optical path or a phase of the outgoing light;

a sensor that acquires positional data of an object surface; and a controller that controls operation of the optical function section on the basis of the positional data and coordinate data of a shaped article, to apply modulated light generated by the optical function section to the object surface.

(2)

The optical shaping apparatus according to (1), in which the optical function section includes a plurality of reflectors that are two-dimensionally arranged and reflect the entered light, and the controller controls operation of each of the reflectors on the basis of the positional data and the coordinate data, to apply the modulated light to the object surface.

(3)

The optical shaping apparatus according to (1), in which the optical function section performs spatial light phase modulation of the entered light, and the controller controls the spatial light phase modulation in the optical function section on the basis of the positional data and the coordinate data, to apply the modulated light to the object surface.

(4)

The optical shaping apparatus according to any one of (1) to (3), in which the controller controls the operation of the optical function section on the basis of the positional data acquired before the light source emits light, and the coordinate data.

(5)

The optical shaping apparatus according to (4), in which the controller controls the operation of the optical function section on the basis of the positional data acquired while the light source emits light, and the coordinate data.

(6)

The optical shaping apparatus according to (4), in which the controller corrects the coordinate data on the basis of the positional data, and controls the operation of the optical function section on the basis of the corrected coordinate data.

(7)

The optical shaping apparatus according to (6), in which the coordinate data includes a plurality of pieces of horizontal cross-sectional data, and the controller corrects the coordinate data to a plurality of pieces of following cross-sectional data along a surface shape of the object surface, on the basis of the positional data, and controls the operation of the optical function section on the basis of the plurality of pieces of following cross-sectional data obtained through the correction.

(8)

The optical shaping apparatus according to (6), in which the coordinate data includes a plurality of pieces of horizontal cross-sectional data, and the controller corrects the horizontal cross-sectional data to following cross-sectional data along a surface shape of the object surface, on the basis of the positional data, and controls the operation of the optical function section on the basis of a plurality of pieces of the following cross-sectional data obtained through the correction.

(9)

The optical shaping apparatus according to (6), in which the coordinate data includes a plurality of pieces of three-dimensional coordinate data each including height direction information equivalent to one another, or a plurality of pieces of two-dimensional coordinate data not including the height direction information, and the controller corrects the coordinate data to following coordinate data along a surface shape of the object surface, on the basis of the positional data, and controls the operation of the optical function section on the basis of the following coordinate data obtained through the correction.

(10)

The optical shaping apparatus according to (6), in which the controller performs, on the basis of the positional data, correction to omit a portion of the coordinate data or correction to add dummy data to the coordinate data, and controls the operation of the optical function section on the basis of corrected coordinate data obtained through the correction.

(11)

The optical shaping apparatus according to (2), in which the optical function section includes a digital mirror device that includes the plurality of reflectors.

(12)

The optical shaping apparatus according to (3), in which the optical function section includes a reflective or transmissive liquid crystal panel.

(13)

The optical shaping apparatus according to any one of (1) to (12), further including:

an electronic apparatus that includes the sensor, the controller, and a first housing protecting the sensor and the controller; and a second housing that protects the light source and the optical function section, in which the first housing and the second housing are provided separately from each other.

(14)

A method of producing a shaped article, the method including:

a first step of forming a first cured resin layer by modulating an optical path or a phase of diffusion light or converging light outputted as outgoing light from a light source, on the basis of positional data of an object surface and one of a plurality of pieces of horizontal cross-sectional data included in coordinate data of a shaped article, and applying modulated light obtained through the modulation, to a surface of a photosensitive resin applied on an object-to-be-stacked; and a second step of forming a second cured resin layer by modulating the optical path or the phase of the diffusion light or the converging light outputted as the outgoing light from the light source, on the basis of the positional data and different one of the pieces of horizontal cross-sectional data in the coordinate data, and applying modulated light obtained through the modulation, to a surface of a photosensitive resin that is newly applied on the first cured resin layer formed by the first step.

(15)

The method of producing the shaped article according to (14), in which in the first step, operation of a plurality of reflectors that are two-dimensionally arranged, is controlled to reflect the diffusion light or the converging light, on the basis of the positional data and the one of the pieces of horizontal cross-sectional data in the coordinate data of the shaped article, and in the second step, the operation of the plurality of reflectors is controlled to reflect the diffusion light or the conversing light, on the basis of the positional data and the different one of the pieces of horizontal cross-sectional data in the coordinate data of the shaped article.

(16)

The method of producing the shaped article according to (14), in which in the first step, spatial light phase modulation of the diffusion light or the converging light that is outputted as the outgoing light from the light source is performed on the basis of the positional data and the one of the pieces of horizontal cross-sectional data in the coordinate data of the shaped article, and in the second step, the spatial light phase modulation of the diffusion light or the converging light that is outputted as the outgoing light from the light source is performed on the basis of the positional data and the different one of the pieces of horizontal cross-sectional data in the coordinate data of the shaped article.

This application is based upon and claims the benefit of priority of the Japanese Patent Application No. 2015-183547 filed with the Japan Patent Office on Sep. 17, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An optical shaping apparatus, comprising:
a light source that includes a first light emitting device, a second light emitting device, and a dichroic mirror, wherein
the first light emitting device is configured to output one of diffusion light or converging light as first outgoing light,
the second light emitting device is configured to output second outgoing light, and the dichroic mirror is configured to reflect the second outgoing light;
an optical function section in an optical path of the first outgoing light and the second outgoing light, wherein the optical function section is configured to:
modulate at least one of the optical path of the first outgoing light or a phase of the first outgoing light; and
reflect the second outgoing light reflected by the dichroic mirror;
a sensor configured to acquire positional data of an object surface; and
a controller configured to:
control the optical function section to:
apply the modulated first outgoing light to the object surface to generate a shaped article; and
apply the second outgoing light, reflected by the optical function section, to a light softening resin layer below the shaped article,
wherein the optical function section is controlled based on the positional data of the object surface and coordinate data of the shaped article.

2. The optical shaping apparatus according to claim 1, wherein
the optical function section includes a plurality of reflectors in a two-dimensional arrangement,
the plurality of reflectors is configured to reflect the first outgoing light output from the first light emitting device,
the controller is further configured to control each reflector of the plurality of reflectors to apply the modulated first outgoing light to the object surface, and
each reflector of the plurality of reflectors is controlled based on the positional data of the object surface and the coordinate data of the shaped article.

3. The optical shaping apparatus according to claim 2, wherein the optical function section includes a digital mirror device that includes the plurality of reflectors.

4. The optical shaping apparatus according to claim 1, wherein
the optical function section is further configured to execute spatial light phase modulation of the first outgoing light output from the first light emitting device, and
the controller is further configured to:
control the execution of the spatial light phase modulation based on the positional data and the coordinate data, to apply the modulated first outgoing light to the object surface; and
control the application of the modulated first outgoing light to the object surface based on the control of the execution of the spatial light phase modulation.

5. The optical shaping apparatus according to claim 4, wherein the optical function section includes one of a reflective liquid crystal panel or a transmissive liquid crystal panel.

6. The optical shaping apparatus according to claim 1, wherein the sensor is further configured to acquire the positional data of the object surface before the output of the first outgoing light by the light source.

7. The optical shaping apparatus according to claim 6, wherein the sensor is further configured to acquire the positional data of the object surface concurrently with the output of the first outgoing light by the light source.

8. The optical shaping apparatus according to claim 6, wherein the controller is further configured to:

correct the coordinate data of the shaped article based on the positional data of the object surface; and control the optical function section based on the corrected coordinate data of the shaped article.

9. The optical shaping apparatus according to claim 8, wherein the coordinate data includes a first plurality of pieces of horizontal cross-sectional data, and the controller is further configured to:

correct the first plurality of pieces of horizontal cross-sectional data to a second plurality of pieces of horizontal cross-sectional data based on the positional data, wherein the first plurality of pieces of horizontal cross-sectional data is different from the second plurality of pieces of horizontal cross-sectional data, and the second plurality of pieces of horizontal cross-sectional data corresponds to a shape of the object surface; and control the optical function section based on the second plurality of pieces of horizontal cross-sectional data of the corrected coordinate data.

10. The optical shaping apparatus according to claim 8, wherein the coordinate data includes a plurality of pieces of horizontal cross-sectional data, and the controller is further configured to:

correct the plurality of pieces of horizontal cross-sectional data to a plurality of pieces of curved cross-sectional data, based on the positional data, wherein the plurality of pieces of curved cross-sectional data corresponds to a shape of the object surface; and control the optical function section based on the plurality of pieces of curved cross-sectional data of the corrected coordinate data.

11. The optical shaping apparatus according to claim 8, wherein the coordinate data includes one of a plurality of pieces of three-dimensional coordinate data or a plurality of pieces of two-dimensional coordinate data, a first piece of three-dimensional coordinate data of the plurality of pieces of three-dimensional coordinate data includes first height direction information equivalent to second height direction information of a second piece of three-dimensional coordinate data of the plurality of pieces of three-dimensional coordinate data, and each of the first height direction information and the second height direction information is absent in the plurality of pieces of two-dimensional coordinate data.

12. The optical shaping apparatus according to claim 8, wherein the controller is further configured to:

at least one of omit a portion of the coordinate data based on the positional data, or add dummy data to the coordinate data based on the positional data; and control the optical function section based on the at least one of the omission of the portion of the coordinate data or the addition of the dummy data to the coordinate data.

13. The optical shaping apparatus according to claim 1, further comprising an electronic apparatus that includes:

the sensor;

the controller;

a first housing that houses the sensor and the controller; and a second housing that houses the light source and the optical function section, wherein the first housing is spaced apart from the second housing.

14. A method of producing a shaped article, the method comprising:

outputting, by a first light emitting device of an optical shaping apparatus, one of first diffusion light or first converging light as first outgoing light;

modulating at least one of a first optical path or a first phase of the first outgoing light, wherein the at least one of the first optical path or the first phase is modulated, by an optical function section of the optical shaping apparatus, based on:

positional data of an object surface, and a first piece of horizontal cross-sectional data of a plurality of pieces of horizontal cross-sectional data in coordinate data of the shaped article;

forming a first cured resin layer by applying the modulated first outgoing light to a surface of a first photosensitive resin on the object surface;

outputting, by the first light emitting device, one of a second diffusion light or a second converging light as second outgoing light;

modulating at least one of a second optical path or a second phase of the second outgoing light, wherein the at least one of the second optical path or the second phase is modulated, by the optical function section, based on:

the positional data of the object surface, and a second piece of horizontal cross-sectional data of the plurality of pieces of horizontal cross-sectional data in the coordinate data;

forming a second cured resin layer by applying the modulated second outgoing light to a surface of a second photosensitive resin on the first cured resin layer;

outputting, by a second light emitting device of the optical shaping apparatus, a third outgoing light;

reflecting the third outgoing light by a dichroic mirror of the optical shaping apparatus;

reflecting, by the optical function section, the third outgoing light reflected from the dichroic mirror; and applying the third outgoing light, reflected by the optical function section, to a light softening resin layer below the first cured resin layer.

15. The method of producing the shaped article according to claim 14, further comprising controlling a plurality of reflectors to:

reflect the one of the first diffusion light or the first converging light based on the positional data and the first piece of horizontal cross-sectional data, wherein the optical function section includes the plurality of reflectors in a two-dimensional arrangement, and reflect the one of the second diffusion light or the second conversing light based on the positional data and the second piece of horizontal cross-sectional data.

16. The method of producing the shaped article according to claim 14, further comprising:

executing spatial light phase modulation of the first outgoing light output from the first light emitting device, wherein the execution of the spatial light phase modulation is based on the positional data and the first piece of horizontal cross-sectional data; and executing the spatial light phase modulation of the second outgoing light output from the first light emitting device, wherein the execution of the spatial light phase modulation of the second outgoing light is based on the positional data and the second piece of horizontal cross-sectional data.

\* \* \* \* \*